(12) United States Patent
Carter et al.

(10) Patent No.: US 9,501,871 B2
(45) Date of Patent: Nov. 22, 2016

(54) EXPLORABLE AUGMENTED REALITY DISPLAYS

(71) Applicant: AT&T Mobility II LLC, Atlanta, GA (US)

(72) Inventors: Patrick Scott Carter, Leawood, KS (US); Diana Horn, Kennesaw, GA (US); Suman Ray, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 56 days.

(21) Appl. No.: 14/265,749

(22) Filed: Apr. 30, 2014

(65) Prior Publication Data

US 2015/0317829 A1  Nov. 5, 2015

(51) Int. Cl.
   *G06T 19/00* (2011.01)
   *G06T 7/00* (2006.01)
   *G02B 27/01* (2006.01)

(52) U.S. Cl.
   CPC .......... *G06T 19/006* (2013.01); *G06T 7/0044* (2013.01); *G06T 19/003* (2013.01); *G02B 27/01* (2013.01); *G06T 2207/10004* (2013.01); *G06T 2207/30244* (2013.01)

(58) Field of Classification Search
   CPC .................. G06T 19/006; G06T 2207/20212; G06T 19/003; G06T 2207/30244; G09G 2340/12; G09G 5/377
   See application file for complete search history.

(56) References Cited

U.S. PATENT DOCUMENTS

| | | | |
|---|---|---|---|
| 7,138,963 B2 | 11/2006 | Hobgood et al. | |
| 8,519,844 B2 | 8/2013 | Richey et al. | |
| 8,547,401 B2 | 10/2013 | Mallinson et al. | |
| 8,654,151 B2 | 2/2014 | Kim | |
| 8,660,369 B2 | 2/2014 | Llano et al. | |
| 2002/0113791 A1* | 8/2002 | Li | G06T 15/20 345/427 |
| 2007/0027591 A1* | 2/2007 | Goldenberg | G06F 17/3087 701/23 |
| 2010/0073201 A1* | 3/2010 | Holcomb | G08G 1/005 340/990 |
| 2010/0238161 A1 | 9/2010 | Varga et al. | |
| 2010/0328344 A1* | 12/2010 | Mattila | G06F 1/1626 345/633 |
| 2011/0164163 A1* | 7/2011 | Bilbrey | G06F 1/1694 348/333.01 |
| 2012/0113285 A1 | 5/2012 | Baker et al. | |
| 2012/0240077 A1* | 9/2012 | Vaittinen | G06F 3/04815 715/781 |
| 2012/0310717 A1* | 12/2012 | Kankainen | 705/14.4 |
| 2013/0222426 A1 | 8/2013 | Hymel | |
| 2013/0335301 A1* | 12/2013 | Wong | G02B 27/0093 345/8 |
| 2013/0346168 A1 | 12/2013 | Zhou et al. | |
| 2014/0043365 A1 | 2/2014 | Fialho et al. | |

FOREIGN PATENT DOCUMENTS

| | | |
|---|---|---|
| KR | 102012135126 | 12/2012 |
| WO | 2013093906 | 6/2013 |
| WO | 2013141862 | 9/2013 |

OTHER PUBLICATIONS

Tatzgern, Markus, et al., "Exploring Distant Objects with Augmented Reality," Joint Virtual Reality Conference of EGVE—EuroVR, 2013.

* cited by examiner

*Primary Examiner* — Michelle L Sams
(74) *Attorney, Agent, or Firm* — Hartman & Citrin LLC

(57) ABSTRACT

Concepts and technologies are disclosed herein for explorable augmented reality displays. An augmented reality service can receive a request for augmented reality display data. The request can be associated with a device. The augmented reality service can determine a location associated with the device and identify augmented reality data associated with the location. The augmented reality service can provide augmented reality display data to the device.

17 Claims, 14 Drawing Sheets

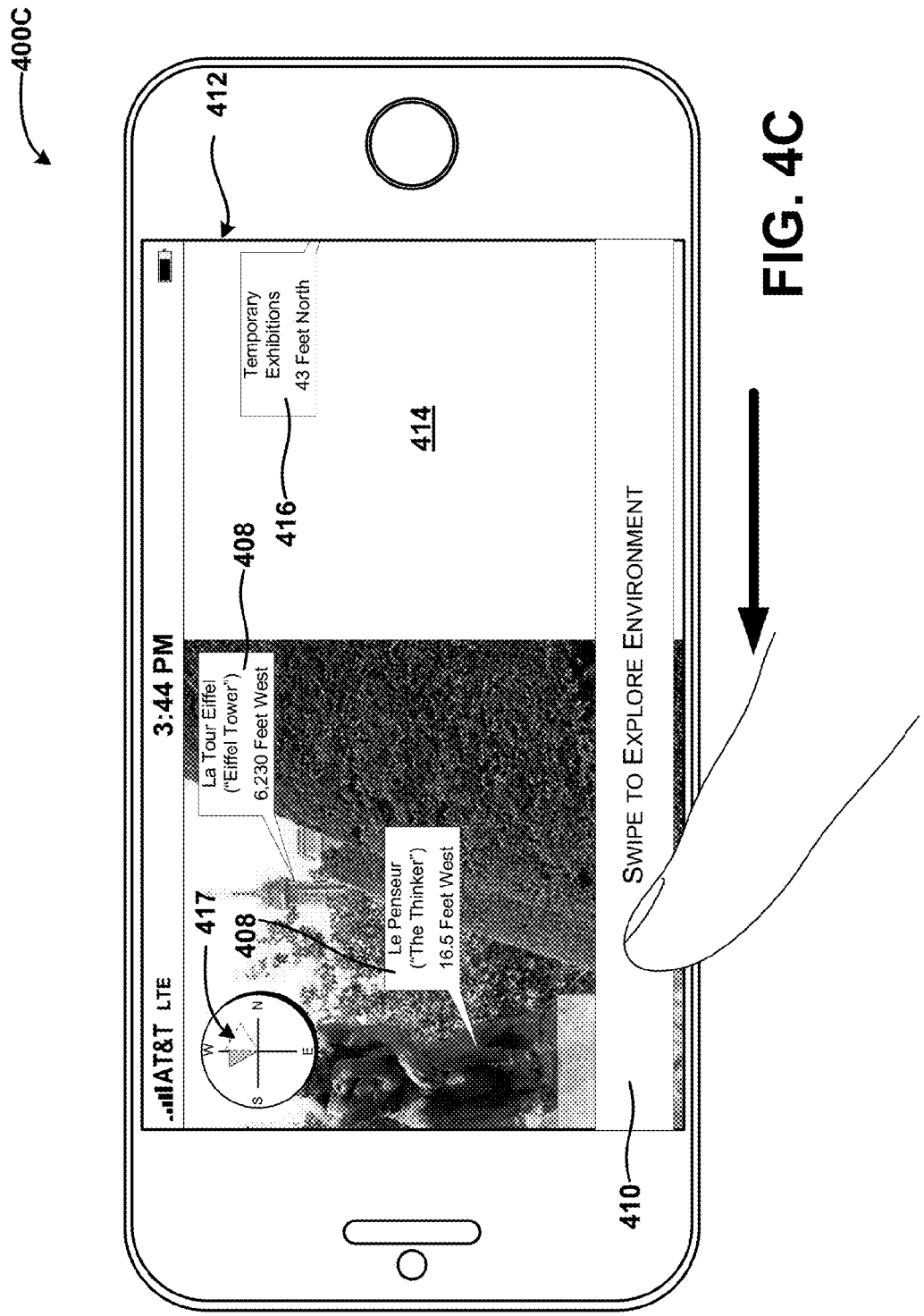

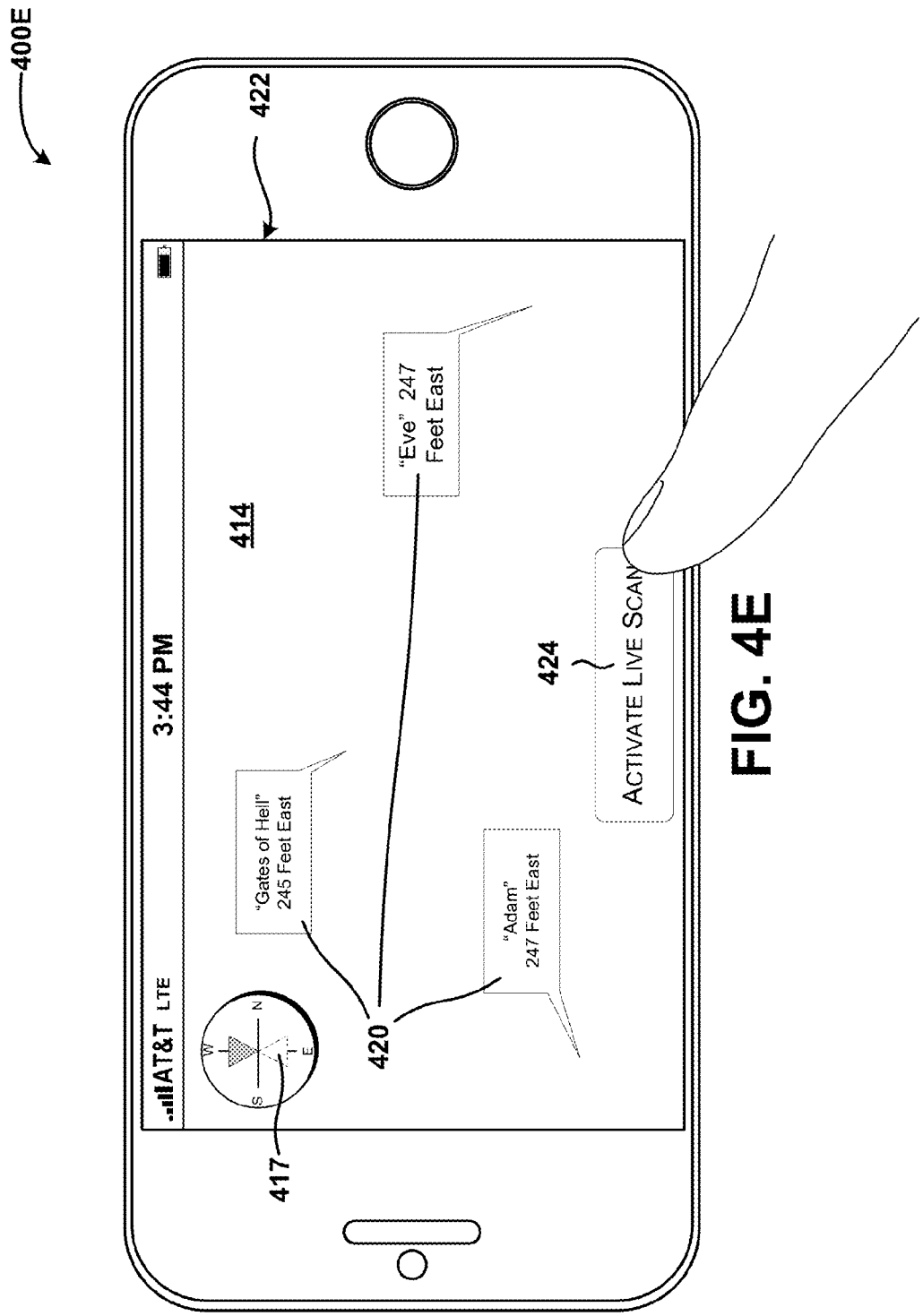

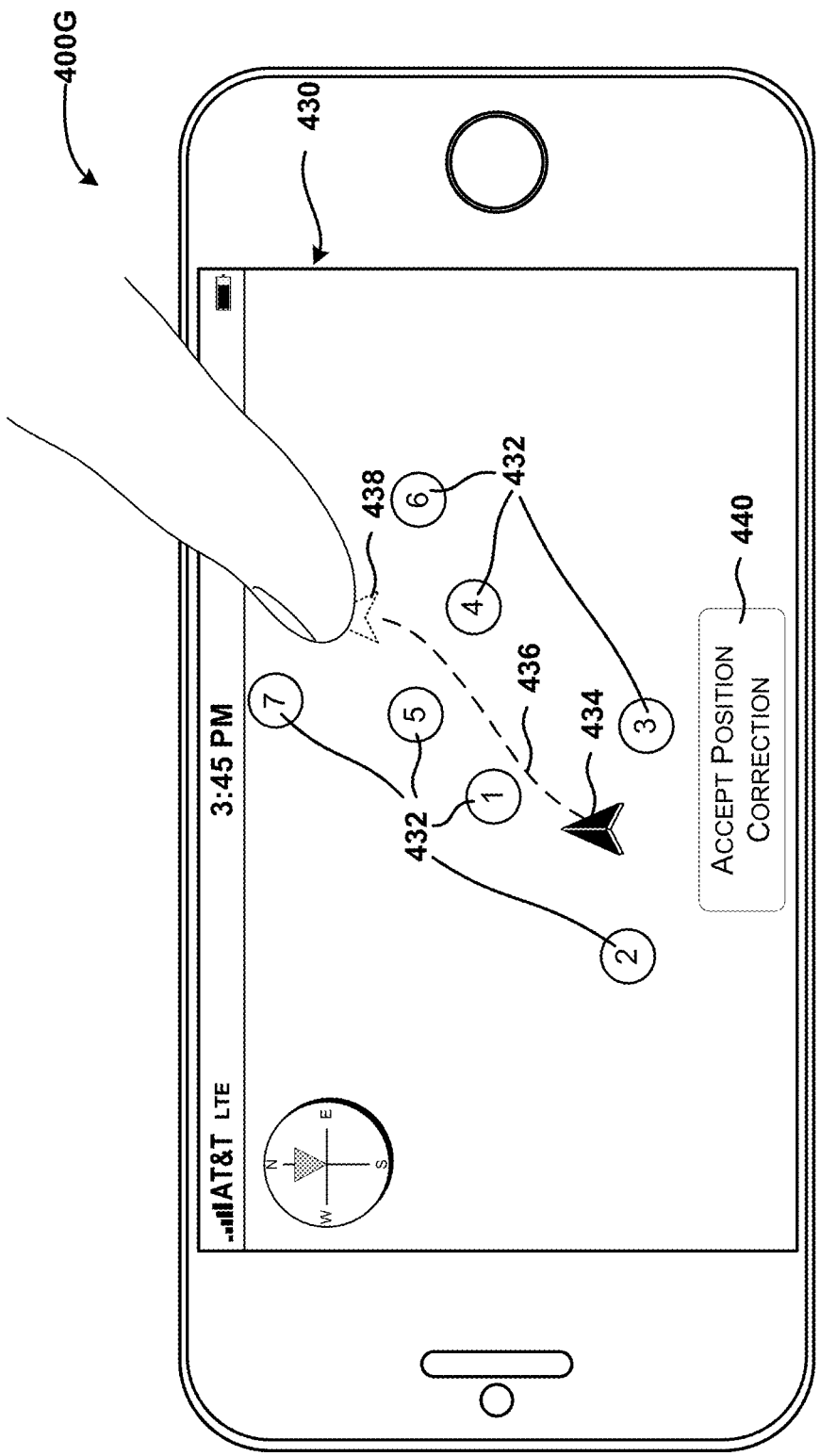

EXPLORABLE AUGMENTED REALITY DISPLAYS

BACKGROUND

Virtual reality and augmented reality are two computer technologies for viewing synthetic or partially synthetic environments. Virtual reality generally is used to refer to computer generated representations of various real-world or fictitious environments. Virtual reality can be used to generate immersive synthetic environments that users can interact with and/or navigate through as if in a real world environment, though the virtual reality environment can be fictional. Some embodiments of virtual reality make use of immersive audio and/or visual technologies to provide realistic experiences in the virtual environments.

Augmented reality can be used to refer to various types of computer assisted representations of the real world. In particular, augmented reality displays sometimes use a photograph or video of a real world environment such as, for example, a photograph or video of an environment around a smartphone as captured by a camera or other imaging device associated with the smartphone. These images can be supplemented with computer generated information such as tags, flags, or the like, which can be used to denote places of interest or other information within the images. The supplemented information can be provided, in some embodiments, as an image overlay that provides information about objects viewable in the image.

Because augmented reality displays are sometimes based upon a photograph, image, or video taken using a device camera, the augmented reality displays generally only provide information about objects in a field of vision of the camera or other imaging device used to capture the photograph, image, or video. To obtain information about objects outside of the camera field of vision, a user turns his or her body (or at least the device housing the camera) toward the objects, thereby prompting download and display of augmented reality elements associated with the objects.

SUMMARY

The present disclosure is directed to explorable augmented reality displays. The explorable augmented reality displays can be used to provide augmented reality elements relevant to objects within a field of vision of a camera or other image capture device, as well as objects outside of a field of vision of the camera of other image capture device. In particular, the explorable augmented reality displays can provide an augmented reality display that enables a user or other entity to explore an area around the user by panning the display to access a three hundred sixty degree view of the surroundings from an augmented reality perspective. As such, while the actual image or video associated with the three hundred sixty degree view may be unavailable (since cameras may be limited to about forty five to sixty degrees of view), augmented reality objects for the full three hundred sixty degrees can be provided and explored, thereby allowing users to see objects in the environment without turning their bodies and/or devices in all three hundred sixty degrees.

As used herein, "explorable" is used to refer to user interfaces that provide a navigable environment for providing information to users. In the context of an augmented reality display, for example, explorable can refer to rendering augmented reality objects outside of a field of view and allowing users to view those objects without turning their bodies or their devices toward directions in which real world objects associated with the augmented reality objects are located. Furthermore, the augmented reality objects outside of the field of view can be downloaded with the objects within the field of view, thereby allowing seamless viewing of the objects without having to request and download the objects from a server or service.

According to various embodiments of the concepts and technologies described herein, an augmented reality service can be executed by a server computer or other computing device. The augmented reality service can be configured to receive a request for augmented reality data from a user or user device. The request can include, or can prompt collection of, location data and orientation data associated with a device used to generate the augmented reality views and/or the request for augmented reality data. The location data can identify a geographic location of the device and can be obtained directly from the device or from one or more location devices in communication with the server computer. The orientation data can identify a facing direction (a direction in which the camera is pointing) associated with the device, a compass bearing associated with the device, a path or vector representing movement or a bearing of the device, combinations thereof, or the like.

The augmented reality service can determine, based upon the location data and the orientation data, objects or points of interest in a field of view or vision of the device associated with the request, as well as objects or points of interest outside of the field of view or vision. The augmented reality service can query or otherwise perform lookup operations on augmented reality data and identify the relevant augmented reality data. The relevant augmented reality data can be packaged and provided to the device associated with the request as augmented reality display data.

The device associated with the request can execute an augmented reality display application that can obtain the augmented reality display data from the augmented reality service, and generate user interface ("UI") elements based upon the augmented reality display data. The user device also can generate and present an explorable augmented reality display that can provide augmented reality elements around a user or user device. Thus, a user can access augmented reality data associated with a location or environment without turning his or her body in all three hundred sixty degrees within the environment. Concepts and technologies described herein also support position and/or location correction. The position and/or location correction can be used to enable augmented reality displays and/or explorable augmented reality displays in environments in which exact location information may be difficult to obtain.

According to one aspect of the concepts and technologies described herein, a method is disclosed. The method can include receiving, at a processor executing an augmented reality service, a request for augmented reality display data, the request being associated with a device. The method also can include determining, at the processor, a location associated with the device, identifying, at the processor, augmented reality data associated with the location, and providing, by the processor, augmented reality display data to the device. The augmented reality display data can include the augmented reality data.

In some embodiments, determining the location associated with the device can include receiving, with the request for the augmented reality display data, location data and orientation data associated with the device. The location data and the orientation data can be captured by the device. In some embodiments, determining the location associated with the device can include accessing a location device to obtain location data associated with the device. Determining the location associated with the device can include determining a geographic location associated with the device and an orientation associated with the device. The orientation associated with the device can include a facing direction.

In some embodiments, the method also can include determining, at the processor, if the location is to be updated, and in response to a determination that the location is to be updated, obtaining, by the processor, a location update from the device. The location update can be provided by the device by presenting a location correction display and receiving an update to the location via the location correction display.

In some embodiments, the augmented reality display data can include augmented reality objects corresponding to objects in proximity to the device. The augmented reality display data can include data that, when presented by the device in an explorable augmented reality display, enables exploration of augmented reality objects outside of a field of view of the device. The augmented reality display data can be provided to the device for presentation in an explorable augmented reality display. In some embodiments, the device can include a smartphone. The smartphone can execute an augmented reality display application that generates the request and the explorable augmented reality display.

According to another aspect of the concepts and technologies described herein, a system is disclosed. The system can include a processor and a memory. The memory can store computer-executable instructions that, when executed by the processor, cause the processor to perform operations. The operations can include receiving a request for augmented reality display data, the request being associated with a device, determining a location associated with the device, identifying augmented reality data associated with the location, and providing augmented reality display data to the device. The augmented reality display data can include the augmented reality data.

In some embodiments, determining the location can include determining a geographic location at which the device is located, and determining an orientation of the device. The orientation can include a facing direction. In some embodiments, determining the location associated with the device can include receiving, with the request for the augmented reality display data, location data and orientation data associated with the device. In some embodiments, the system can include computer-executable instructions that, when executed by the processor, cause the processor to perform operations further including determining if the location is to be updated, and in response to a determination that the location is to be updated, obtaining a location update from the device. The augmented reality display data can be provided to the device for presentation in an explorable augmented reality display.

According to another aspect of the concepts and technologies described herein, a computer storage medium is disclosed. The computer storage medium can have computer-executable instructions stored thereon that, when executed by a processor, cause the processor to perform operations. The operations can include receiving a request for augmented reality display data, the request being associated with a device, determining a location associated with the device, identifying augmented reality data associated with the location, and providing augmented reality display data to the device. The augmented reality display data can include the augmented reality data.

In some embodiments, determining the location can include determining a geographic location at which the device is located, and determining an orientation of the device. The orientation can include a facing direction. In some embodiments, determining the location associated with the device can include obtaining location data and orientation data associated with the device. The computer storage medium also can include computer-executable instructions that, when executed by the processor, cause the processor to perform operations further including determining if the location is to be updated, and in response to a determination that the location is to be updated, obtaining a location update from the device. The augmented reality display data can be provided to the device for presentation in an explorable augmented reality display.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

BRIEF DESCRIPTION OF THE DRAWINGS

FIGS. 4A-4H are user interface ("UI") diagrams showing aspects of UIs for providing explorable augmented reality displays, according to various illustrative embodiments.

DETAILED DESCRIPTION

Figure 1:
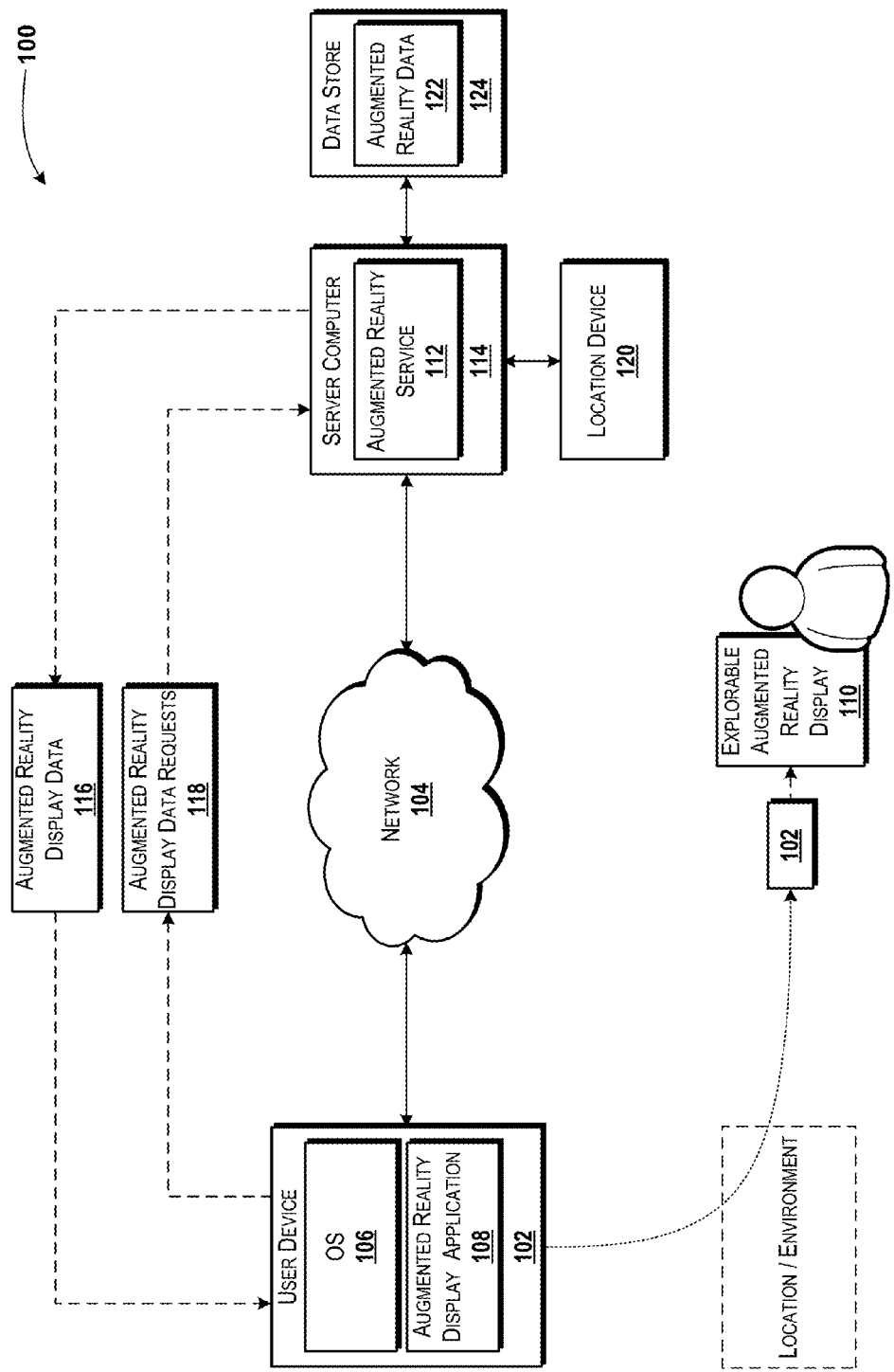
FIG. 1 is a system diagram illustrating an illustrative operating environment for the various embodiments disclosed herein.

The following detailed description is directed to explorable augmented reality displays The explorable augmented reality displays can be used to provide augmented reality elements relevant to objects within a field of vision of a camera or other image capture device, as well as objects outside of a field of vision of the camera of other image capture device. Thus, the concepts and technologies described herein can be used to provide a user with access to augmented reality information in an environment without requiring the user or device to turn in each direction of the environment. Thus, augmented reality objects for three hundred sixty degrees around a device can be provided and explored.

According to various embodiments of the concepts and technologies described herein, an augmented reality service can be executed by a server computer or other computing device. The augmented reality service can be configured to receive a request for augmented reality data from a user or user device. The augmented reality service can determine a location associated with the request. In some embodiments, location data and/or orientation data can be included with the request, while in some other embodiments, the augmented reality service can collect the location data and/or orientation data from other devices, systems, or nodes. The location data can identify a geographic location of the device, and the orientation data can identify a facing direction (a direction in which the camera is pointing) associated with the device, a compass bearing associated with the device, a path or vector representing movement or a bearing of the device, combinations thereof, or the like.

The augmented reality service can determine, based upon the location data and the orientation data, objects or points of interest in a field of view or vision of the device associated with the request, as well as objects or points of interest outside of the field of view or vision. The augmented reality service can provide the relevant augmented reality data to the device associated as augmented reality display data. The device can obtain the augmented reality display data from the augmented reality service, and generate user interface elements based upon the augmented reality display data. The device also can generate and present an explorable augmented reality display that can provide augmented reality elements around a user or user device. Thus, a user can access augmented reality data associated with a location or environment without turning his or her body or the device in all three hundred sixty degrees within the environment. Concepts and technologies described herein also support position and/or location correction. The position and/or location correction can be used to enable augmented reality displays and/or explorable augmented reality displays in environments in which exact location information may be difficult to obtain.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for explorable augmented reality displays will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more server computers, desktop computers, mobile telephones, laptop computers, set-top boxes, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, an augmented reality display application 108. The operating system 106 is a computer program for controlling the operation of the user device 102. The augmented reality display application 108 is an executable program configured to execute on top of the operating system 106 to provide the functionality described herein for providing explorable virtual reality displays.

In particular, the augmented reality display application 108 can be configured to generate and present an explorable augmented reality display 110 and to support various interactions between a user or other entity and the explorable augmented reality display 110. In some embodiments, the explorable augmented reality display 110 can be presented to a user or other entity associated with the user device 102, though this is not necessarily the case. In particular, as generally is understood, an augmented reality display can include a user interface overlay or other user interface elements that can be used to supplement a view of an environment. For example, if the user device 102 passes into or through an environment such as the location or environment ("location/environment") shown in FIG. 1, an augmented reality display such as the explorable augmented reality display 110 can be used to overlay a captured photograph or video with information about the location or environment. Thus, an entity such as a user can view the explorable augmented reality display 110 to learn information about the environment such as, for example, points of interest, sites, historical information, businesses, combinations thereof, or the like.

The augmented reality display application 108 can be configured to capture video or other imagery at or near the user device 102, and to obtain augmented reality information that can be used to supplement the display of the imagery. In some embodiments, the augmented reality display application 108 can be configured to generate user interface ("UI") elements and present the UI elements in the explorable augmented reality displays 110. Furthermore, the augmented reality display application 108 can be configured to support location and/or position correction, which are illustrated and described in more detail below, particularly with reference to FIGS. 4A-4H. These and other functions of the augmented reality display application 108 will be further described below.

According to various embodiments, the user device 102 can communicate with an augmented reality service 112. According to various embodiments, the augmented reality service 112 can include a server application or module executed or hosted by a computing device such as a server computer 114. According to some embodiments, the augmented reality service 112 can be a callable service that can be configured to generate augmented reality display data 116, and to provide the augmented reality display data 116 to the user device 102. In some embodiments, the augmented reality service 112 can provide the augmented reality display data 116 in response to a request or call from the user device such as, for example, an augmented reality display data request 118.

In particular, the augmented reality service 112 can receive an augmented reality display data request 118 from the user device 102. The augmented reality service 112 can determine a location and orientation associated with the user device 102 in response to receiving the augmented reality display data request 118, in some embodiments. In some other embodiments, the augmented reality display data request 118 can include an indication of the location and orientation of the user device 102. Thus, for example, the augmented reality display data request 118 can include a geographic location that can be determined by the user device 102, for example using a global positioning system ("GPS") receiver and/or other location determination hardware and/or software. The augmented reality display data request 118 also can indicate an orientation of the user device 102, for example a direction to which the user device 102 is facing. The direction can be determined, for example, based upon a bearing of the user device 102 and/or various sensors such as magnetometers, accelerometers, gyroscopes, combinations thereof, or the like.

In some other embodiments, the augmented reality service 112 can be configured to obtain location information associated with the user device 102. Thus, for example, the augmented reality service 112 can communicate with a location device 120 such as, for example, a location server, a location beacon, or other location determination hardware and/or software to determine the location of the user device 102. In some embodiments, the location device 120 also can determine or obtain a bearing, facing direction, and/or other orientation information associated with the user device 102. In some contemplated embodiments, the location device 120 can include a location server of a cellular network, which can determine location using GPS, triangulation, SSID information of WiFi hotspots in a proximity of the user device 102, combinations thereof, or the like.

In some embodiments, the functionality of the location device 120 can be supplemented and/or replaced by various application programming interfaces ("APIs"). In particular, the augmented reality service 112 can access, call, and/or receive information from various location services and/or APIs associated with location services and/or software. Contemplated examples include, but are not limited to a location service or API provided by a member of the AT&T family of products from AT&T Inc., a member of the GOOGLE family of products from Google, Inc, a member of the APPLE family of products from Apple Company, a member of the MICROSOFT family of products from Microsoft Corporation, and/or other location services and/or APIs, It should be understood that these examples are illustrative and therefore should not be construed as being limiting in any way.

According to various embodiments, the augmented reality service 112 can analyze the augmented reality display data request 118 and a location and orientation associated with the user device 102 to identify data to be provided to the user device 102 for presentation in an explorable augmented reality display 110. In various embodiments, the augmented reality service 112 can access augmented reality data 122 and identify relevant portions of the augmented reality data 122 based upon the augmented reality display data request 118 and/or the location and orientation determined for the user device 102.

In various embodiments, the augmented reality data 122 can be stored in a data storage device such as a data store 124, or the like. According to various embodiments, the augmented reality data 122 can be stored with data or other information that associates the augmented reality data 122 with various locations. The augmented reality data 122 can be stored in a table, database, or other data structure that can support querying and/or other lookup operations. As such, the augmented reality data 122 can be searched according to various aspects of the augmented reality data 122, and the augmented reality service 112 can identify relevant augmented reality data 122 based upon various aspects of the augmented reality data 122 including, but not limited to, location, user, permissions, preferences, facing direction, or the like. The augmented reality service 112 can be configured to control storage of the augmented reality data 122, in some embodiments, though this is not necessarily the case.

The augmented reality service 112 can therefore be configured to receive the augmented reality display data request 118, determine a location and orientation associated with the requestor (and/or included in the augmented reality display data request 118), and access the augmented reality data 122 to identify augmented reality data 122 relevant to the requestor. The augmented reality service 112 can package the relevant data and transmit the relevant data to the user device 102 (or other requestor) as the augmented reality display data 116. In some embodiments, the orientation of the requestor is not obtained, and instead the user device 102 can determine what data to show first in the explorable augmented reality display 110 based upon the orientation.

Upon receiving the augmented reality display data 116, the user device 102 can, via execution of the augmented reality display application 108 and/or other application programs, generate the explorable augmented reality display 110. As will be explained in more detail below, the explorable augmented reality display 110 can include an augmented reality display that shows tags or other UI elements for indicating points of interest, businesses, sites, or the like. The explorable augmented reality display 110 also can include tags or other UI elements that are outside a current view of the augmented reality display. Thus, for example, a user facing north can, via manipulation of the explorable augmented reality display 110, view tags or other UI elements associated with points of interest located to the south of the user. These aspects of the concepts and technologies described herein will be easier understood with reference to FIGS. 4A-4H below.

Various embodiments of the concepts and technologies described herein can be used to allow users to view points of interest and/or other information relevant to an environment using augmented reality without being required to turn their bodies (and/or facing direction of devices) to capture video or photographs in all directions. Thus, embodiments of the concepts and technologies described herein can improve a user experience when using augmented reality in various environments and/or in low light conditions by obviating the need to turn around to see points of interest in the explorable augmented reality display 110. These and other aspects of the concepts and technologies described herein will be easier understood with reference to FIGS. 4A-4H below.

FIG. 1 illustrates one user device 102, one network 104, one server computer 114, and one location device 120. It should be understood, however, that various implementations of the operating environment 100 include zero, one, or more than one user device 102, zero, one, or more than one network 104, zero, one, or more than one server computer 114 and/or zero, one, or more than one location device 120. As such, the illustrated embodiment should be understood as being illustrative, and should not be construed as being limiting in any way.

Figure 2:
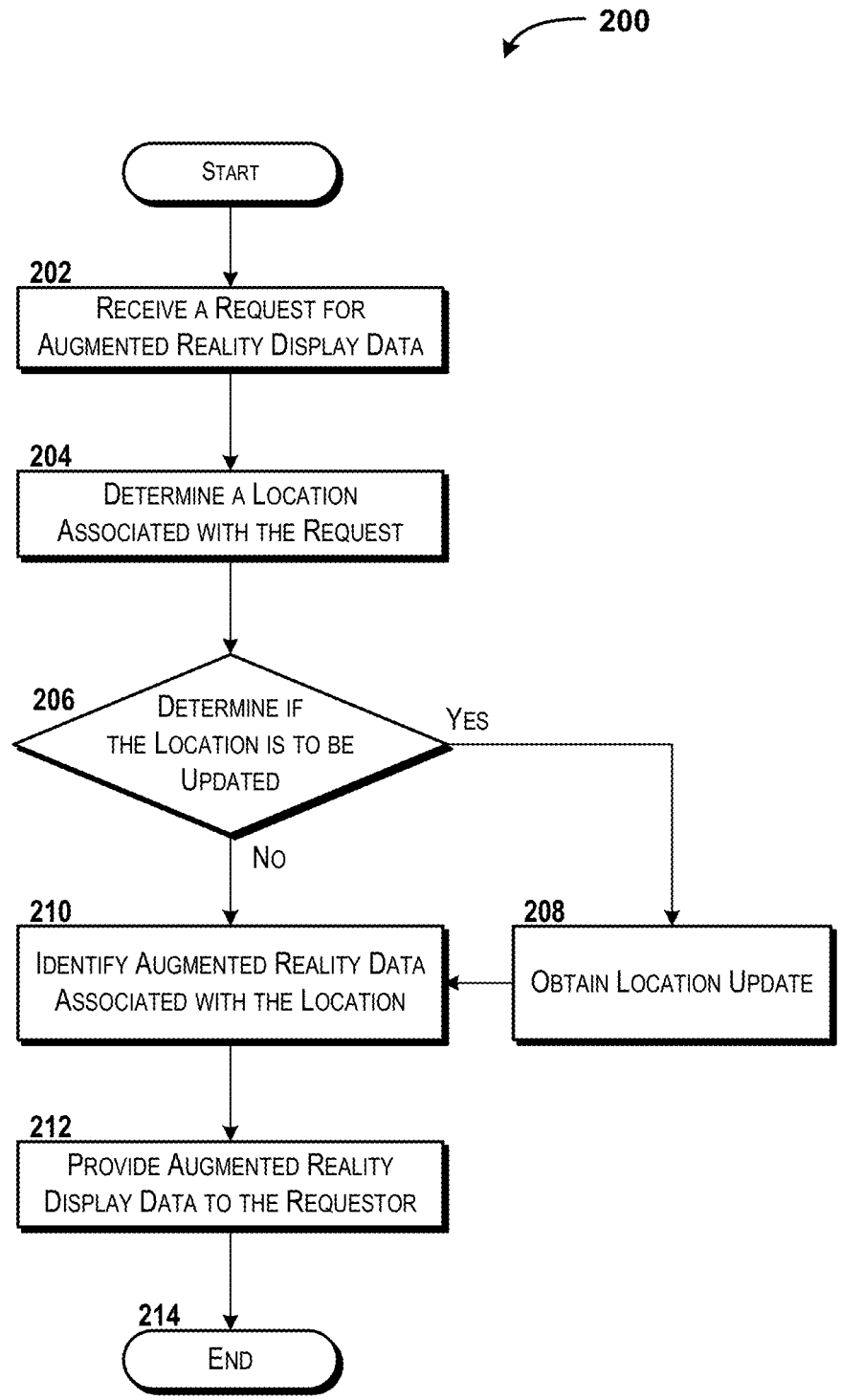
FIG. 2 is a flow diagram showing aspects of a method for providing augmented reality data to a device, according to an illustrative embodiment.

Turning now to FIG. 2, aspects of a method 200 for providing augmented reality data to a device will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, the user device 102 or the server computer 114 to perform one or more operations and/or causing the processor to direct other components of the computing system or device to perform one or more of the operations.

For purposes of illustrating and describing the concepts of the present disclosure, the method 200 is described as being performed by the server computer 114 via execution of one or more software modules such as, for example, the augmented reality service 112. It should be understood that additional and/or alternative devices and/or network nodes can provide the functionality described herein via execution of one or more modules, applications, and/or other software including, but not limited to, the augmented reality service 112. Thus, the illustrated embodiments are illustrative, and should not be viewed as being limiting in any way.

The method 200 begins at operation 202. At operation 202, the server computer 114 receives a request for augmented reality display data 116. In some embodiments, the request received in operation 202 can include an augmented reality display data request 118. The augmented reality display data request 118 can be triggered, for example, by activation, at the user device 102, of an option to present an augmented reality display. In some embodiments, the request is generated by starting an application, by accessing a camera application, by selecting an explicit option to present an augmented reality display, combinations thereof, or the like. In various embodiments of the concepts and technologies described herein, the augmented reality display data request 118 can be generated by the user device 102 in response to detecting execution of an application to present an explorable augmented reality display 110. It should be understood that this example is illustrative and therefore should not be construed as being limiting in any way.

From operation 202, the method 200 proceeds to operation 204. At operation 204, the server computer 114 determines a location associated with the request received in operation 202. In some embodiments, as explained above, the server computer 114 can, upon receiving the request in operation 202, access one or more location devices 120 to determine a location associated with the user device 102. In addition to providing location, the location devices 120 also can provide orientation information relating to the user device 102. The orientation information can reflect, for example, a compass bearing of the user device 102; a direction, path, or vector of movement of the user device 102; a facing direction associated with the user device 102; combinations thereof; or the like. Some or all of these orientation data can be obtained from the user device 102 by the location device 120 and/or the server computer 114. In some embodiments, as noted above, the orientation data may not be obtained by the server computer 114, and instead can be obtained at the device and used to customize an initial display of the explorable augmented reality display 110. It should be understood that this example is illustrative and therefore should not be construed as being limiting in any way.

In some other embodiments, the location data and/or the orientation data can be included in the request received in operation 202. As used herein, "location data" can refer to data that identifies a geographic location. The location data can include, for example, GPS coordinates or other data that identifies a location. As used herein, "orientation data" can include, for example, a compass bearing, direction or path of movement, a movement vector, a facing direction, combinations thereof, or the like. It should be understood that this example is illustrative and therefore should not be construed as being limiting in any way.

From operation 204, the method 200 proceeds to operation 206. At operation 206, the server computer 114 can determine if the location determined in operation 204 is to be updated. In some embodiments, the concepts and technologies described herein can be used to provide explorable augmented reality displays inside buildings and/or elsewhere where an accurate geographic location may not be available. For example, if the concepts and technologies described herein are used to generate the explorable augmented reality display 110 within a museum or other indoor space, GPS coordinates may be unavailable due to GPS "shadow." Thus, the concepts and technologies described herein support presenting a user interface for allowing a user to update a location. The server computer 114 also can determine that location is to be updated for additional or alternative reasons, and as such, the above examples are illustrative and should not be construed as being limiting in any way.

According to various embodiments, the user can update the location using a display generated by the augmented reality display application 108. As such, the display used to update or correct location can be based upon the location of various tags or other augmented reality display UI elements. Thus, for example, if a user facing north knows that a first item "ItemA" is located to his or her north, and that a second item "ItemB" is located to his or her south, the user can indicate his or her present location relevant to ItemA and ItemB via manipulating representations on a display. One contemplated embodiment of the UI for updating a location is illustrated and described below with reference to FIGS.

4G-4H. Because the location can be updated in additional and/or alternative ways, it should be understood that this example is illustrative and therefore should not be construed as being limiting in any way.

If the server computer 114 determines at operation 206 that the location is to be updated, the method 200 proceeds to operation 208. At operation 208, the server computer 114 can obtain a location update. In some embodiments, as described above, the server computer 114 can instruct the user device 102 to obtain a location update, for example via a UI as illustrated and described herein. In other embodiments, the server computer 114 can contact one or more location devices 120 such as location beacons within an environment or location to determine an updated location associated with the user device 102. Because the location can be updated in additional and/or alternative ways, it should be understood that these examples are illustrative and therefore should not be construed as being limiting in any way.

If the server computer 114 determines at operation 206 that the location is not to be updated, the method 200 proceeds to operation 210. The method 200 also can proceed to operation 210 from operation 208. At operation 210, the server computer 114 can identify augmented reality data 122 associated with the location determined in operations 204 and/or 208. As explained above, the server computer 114 can access the augmented reality data 122 via lookup operations and/or other database or table operations to identify relevant and/or associated augmented reality data 122. The augmented reality data 122 can be determined to be associated with the location based upon various data associations and/or analyses by the augmented reality service 112, as generally is understood and therefore will not be further described herein.

From operation 210, the method 200 proceeds to operation 212. At operation 212, the server computer 114 provides augmented reality display data 116 to the requestor associated with the request received in operation 202. In the context of FIG. 1, operation 212 can correspond to the server computer 114 providing the augmented reality display data 116 to the user device 102, though this is not necessarily the case. Although not separately illustrated in FIG. 2, it should be understood that operation 212 can include the server computer 114 packaging the augmented reality data 122 identified in operation 210 and providing the data 122 to the user device 102 or other requestor. As such, the augmented reality display data 116 can be provided to the user device 102 as a single download, thereby obviating the need to download augmented reality display data 116 when the device 102 is turned or otherwise manipulated to face an area outside of a previous field of vision. It should be understood that this example is illustrative and therefore should not be construed as being limiting in any way.

From operation 212, the method 200 proceeds to operation 214. The method 200 ends at operation 214.

Figure 3:
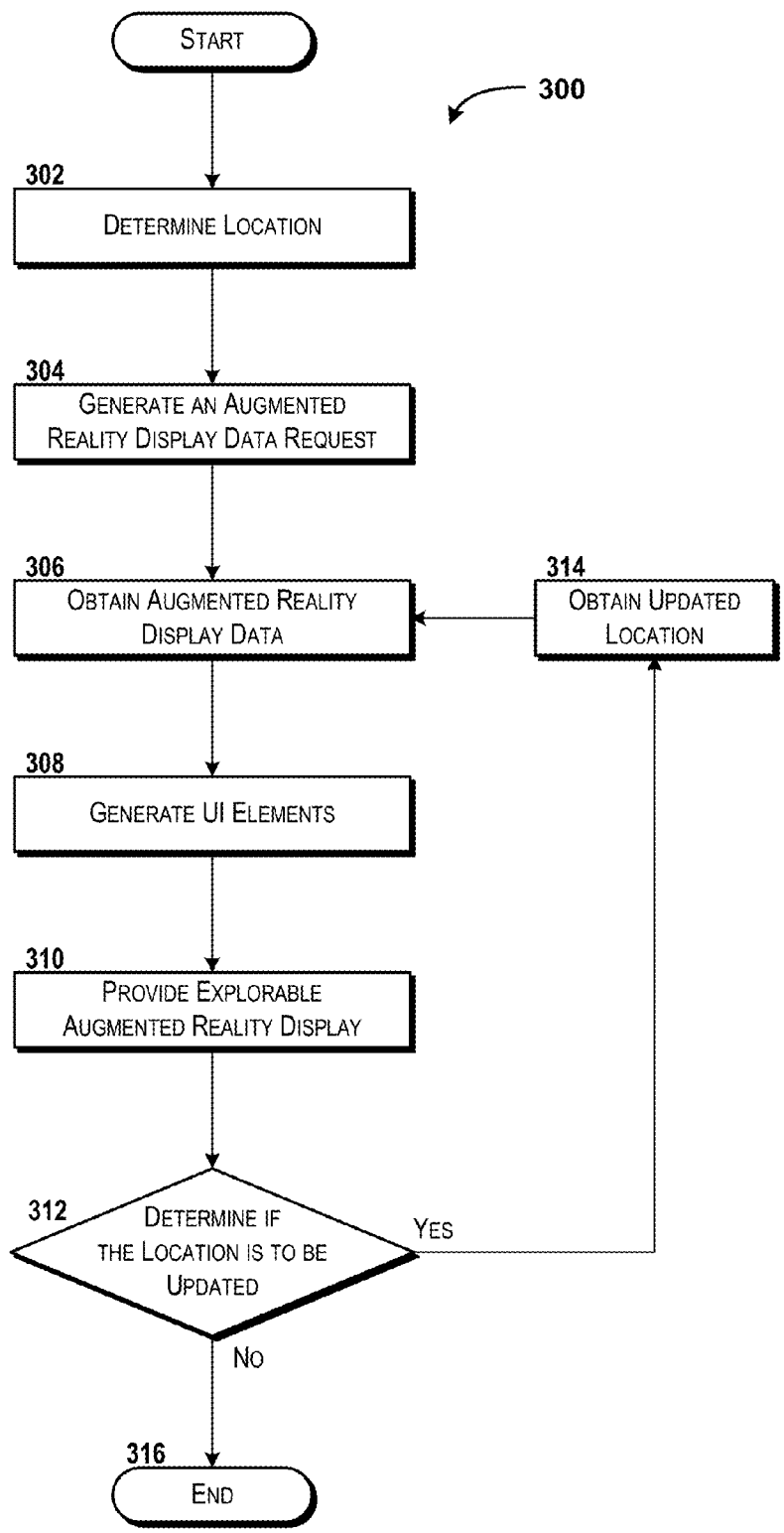
FIG. 3 is a flow diagram showing aspects of a method for requesting and presenting an explorable augmented reality display at a device, according to another illustrative embodiment.

Turning now to FIG. 3, aspects of a method 300 for requesting and presenting an explorable augmented reality display at a device will be described in detail, according to an illustrative embodiment. For purposes of illustrating and describing the concepts of the present disclosure, the method 300 is described as being performed by the user device 102 via execution of one or more software modules such as, for example, the augmented reality display application 108. It should be understood that additional and/or alternative devices and/or network nodes can provide the functionality described herein via execution of one or more modules, applications, and/or other software including, but not limited to, the augmented reality display application 108. Thus, the illustrated embodiments are illustrative, and should not be viewed as being limiting in any way.

The method 300 begins at operation 302. At operation 302, the user device 102 determines a location. The user device 102 also can determine its orientation, in some embodiments, though this is not necessarily the case. According to various embodiments, the user device 102 can periodically determine its location and/or orientation. In some other embodiments, the user device 102 can determine its location and/or orientation based upon a request to display an augmented reality display or an explorable augmented reality display 110. In the embodiment shown in FIG. 3, the user device 102 can be configured to determine its location and/or orientation based upon a request for an explorable augmented reality display 110. The request can be an explicit request or an implicit request.

In particular, the request can correspond to an explicit request such as a selection of a UI element to present an explorable augmented reality display 110. In some other embodiments, the request can correspond to an implicit request such as, for example, activation of the augmented reality display application 108. Thus, in operation 302, the user device 102 can detect a user request for an explorable augmented reality display 110, and as a result, can determine a location and/or orientation. Because the location and/or orientation can be determined in response to other triggers or events, it should be understood that these examples are illustrative and therefore should not be construed as being limiting in any way.

From operation 302, the method 300 proceeds to operation 304. At operation 304, the user device 102 generates an augmented reality display data request 118. The augmented reality display data request 118 can include data identifying the location and/or orientation determined in operation 302, and can request augmented reality display data 116. The user device 102 can transmit the augmented reality display data request 118 to the server computer 114 or another device, system, or node. In the embodiment shown in FIG. 1, the user device 102 transmits the augmented reality display data request 118 to the augmented reality service 112 executed by the server computer 114. It should be understood that this example is illustrative and therefore should not be construed as being limiting in any way.

The augmented reality display data request 118 can request data relevant and/or associated with the location and/or orientation determined in operation 302. The augmented reality display data request 118 therefore can be used to obtain augmented reality display data 116 that can be presented by the user device 102 in the explorable augmented reality display 110.

From operation 304, the method 300 proceeds to operation 306. At operation 306, the user device 102 obtains augmented reality display data 116. According to various embodiments of the concepts and technologies described herein, the user device 102 can receive the augmented reality display data 116 as a response to the augmented reality display data request 118, though this is not necessarily the case. In some other embodiments, the user device 102 can be configured to obtain the augmented reality display data 116 by accessing a server or other device that can serve the relevant data. Because the augmented reality display data 116 can be obtained in additional and/or alternative ways, it should be understood that these examples are illustrative and therefore should not be construed as being limiting in any way.

From operation 306, the method 300 proceeds to operation 308. At operation 308, the user device 102 generates UI elements. The UI elements generated in operation 308 can correspond to various UI elements of the explorable augmented reality display 110. The user device 102 can generate the UI elements based upon the augmented reality display data 116 received in operation 306.

The UI elements generated in operation 308 can include, for example, tags, flags, text, photographs, icons, and/or other UI elements for presentation within or as the explorable augmented reality display 110. In addition to generating UI elements such as overlay elements with tags, flags, or the like for a visible field of view within the explorable augmented reality display 110, the user device 102 also can generate UI elements that are outside of the visible field of view within the explorable augmented reality display 110.

In particular, for example, if the user device 102 is facing north and is presenting within the explorable augmented reality display 110 a field of view of about sixty degrees, any points of interest or other objects located to the south of the user device 102 would generally not be visible in the current view of the explorable augmented reality display 110. According to various embodiments of the concepts and technologies described herein, however, the user device 102 can generate UI elements associated with the points of interest and/or other objects located around the user device 102, thereby enabling exploration within the explorable augmented reality display 110. Thus, some embodiments of the concepts and technologies described herein include rendering UI elements around three hundred sixty degrees around the user device 102, though this is not necessarily the case.

In particular, various embodiments of the concepts and technologies described herein allow a user facing north to input a command to view objects located to his or her south or other direction outside of a current visible field of view without turning his or her body or device to face that direction. For example, a user can select a UI control to explore in one or more directions, enter a swipe command on a touch screen, and/or enter other types of input to view UI elements associated with portions of the location or environment outside of the visible field of view of the explorable augmented reality display 110. Thus, for example, a user facing north can swipe to the right in the explorable augmented reality display 110 to view UI elements associated with points of interest or other objects located to the east, south, west, north, and/or points between. Thus, a user may not need to turn his or her body or device to these directions to determine points of interest or other objects in those directions. It should be understood that this example is illustrative and therefore should not be construed as being limiting in any way.

From operation 308, the method 300 proceeds to operation 310. At operation 310, the user device 102 can provide the explorable augmented reality display 110. Thus, the user device 102 can present the explorable augmented reality display 110 on a display device or otherwise output the explorable augmented reality display 110. Operation 310 also can include various manipulations within the explorable augmented reality display 110 by the user and display of UI elements by the user device 102 in response to these manipulations. It should be understood that this example is illustrative and therefore should not be construed as being limiting in any way.

From operation 310, the method 300 proceeds to operation 312. At operation 312, the user device 102 can determine if the location determined in operation 302 is to be updated. In some embodiments, operation 312 can correspond to a user selection of a UI control for updating location. In some other embodiments, operation 312 can correspond to the user device 102 determining, based upon data received from the server computer 114 and/or based upon other information, that the location is to be updated. In some embodiments, the user selects an option to update location, and in response thereto, the user device 102 can present a UI to update location. One example embodiment of the UI for updating location is illustrated and described below with reference to FIGS. 4G-4H. It should be understood that this example is illustrative and therefore should not be construed as being limiting in any way.

If the user device 102 determines, in operation 312, that the location is to be updated, the method 300 can proceed to operation 314. In operation 314, the user device can obtain updated location information. As noted above, operation 314 can correspond to presentation of a UI for updating location and/or receiving data via that UI and receipt, via the UI, of updated location information. From operation 314, the method 300 can proceed to operation 306, and the user device 102 can obtain augmented reality display data 116 associated with the updated location. Although not shown in FIG. 3, it should be understood that the user device 102 can be configured to generate a new augmented reality display data request 118 after receiving updated location data. Such may be the case where the location is adjusted such that that the available augmented reality display data 116 is insufficient to provide UI elements at the updated location. It should be understood that this example is illustrative and therefore should not be construed as being limiting in any way.

If the user device 102 determines, in operation 312, that the location is not to be updated, the method 300 can proceed to operation 316. The method 300 ends at operation 316.

Figure 4A:
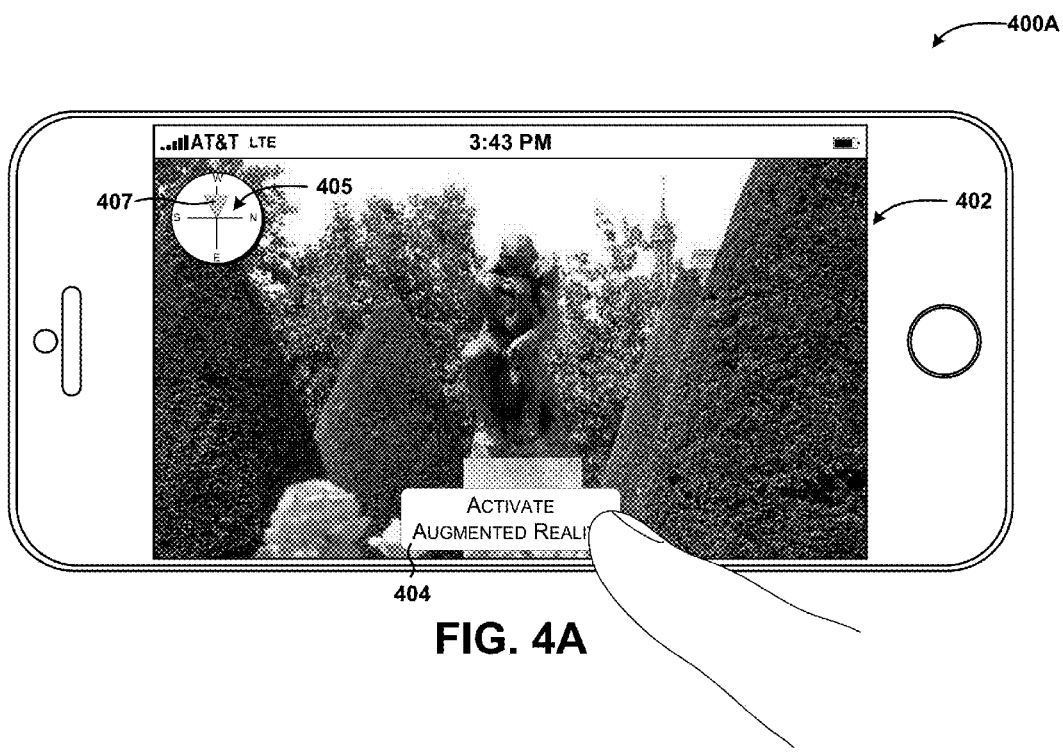

FIGS. 4A-4H are user interface ("UI") diagrams showing aspects of UIs for generating, presenting, and exploring explorable augmented reality displays 110, according to some illustrative embodiments. FIG. 4A shows an illustrative screen display 400A generated by a device such as the user device 102. According to various embodiments, the user device 102 can generate the screen display 400A and/or other screen displays in conjunction with and/or based upon activation of the augmented reality display application 108 described herein. It should be appreciated that the UI diagram illustrated in FIG. 4A is illustrative of one contemplated example of the UIs that can be generated and/or displayed in accordance with the concepts and technologies disclosed herein, and therefore should not be construed as being limited in any way.

The screen display 400A can include various menus and/or menu options (not shown in FIG. 4A). The screen display 400A also can include camera view display or window ("camera display 402"). The camera display 402 can correspond to a current view of a location or environment as viewed through a camera or other capture device associated with the user device 102. Thus, the camera display 402 can correspond to a part of a viewable location or environment from the perspective of the user device 102 and/or a user associated with the user device.

It should be appreciated that the screen display 400A can be presented, for example, in response to receiving activation of the camera or other capture device at the user device 102, activation of the augmented reality display application 108, or the like. Because the screen display 400A illustrated in FIG. 4A can be displayed at additional and/or alternative times, it should be understood that this example is illustrative and therefore should not be construed as being limiting in any way.

The camera display 402 can include a UI control 404. Selection of the UI control 404 can cause the user device 102 to obtain augmented reality display data 116 and/or to present the augmented reality display data 116 in an explorable augmented reality display 110. Because the camera display 402 can include additional or alternative UI controls, it should be understood that this example is illustrative and therefore should not be construed as being limiting in any way.

It can be appreciated from the above description of FIGS. 1-3 that selection of the UI control 404 can cause the user device 102 to generate an augmented reality display data request 118 and/or to obtain the augmented reality display data 116. Selection of the UI control 404 also can cause the device to obtain or determine its location and/or to capture orientation data as explained above. Because additional and/or alternative actions can be taken in response to selection of the UI control 404, it should be understood that these embodiments are illustrative, and should not be construed as being limiting in any way.

The screen display 400A shown in FIG. 4A also includes a viewing direction and viewing scope indicator ("viewing direction indicator") 405. The viewing direction indicator 405 can display information that indicates a pointing direction. The pointing direction can inform a user or other entity as to a direction in which the user is facing and/or a scope of view included in the displayed view. As shown in FIG. 4A, the viewing direction indicator 405 can include a viewing scope and direction cone ("view cone") 407. The view cone 407 can schematically illustrate a scope or amount, for example in degrees, of a three hundred sixty degree radius about the user or other entity that is visible in the screen display 400A. Thus, a user or other entity can, via reference to the viewing direction indicator 405 and the view cone 407, determine a direction in which the user or other entity is facing (west in the illustrated embodiment), and a relative scope of view that is visible to the user or other entity (approximately fifteen degrees in the illustrated embodiment).

In some other embodiments, a compass readout and/or display can be included in the screen display 400A. Thus, for example, hash marks corresponding to degrees of a compass and/or directions of a compass can be displayed on the screen display 400A in addition to, or instead of, the viewing direction indicator 405 and/or the view cone 407. Because a user's pointing direction and/or a scope of view can be illustrated in various other ways, it should be understood that the illustrated example is illustrative and therefore should not be construed as being limiting in any way. Additional iterations of the viewing direction indicator 405 and/or the viewing cone 407 are illustrated and described below and therefore will be further understood with reference to FIGS. 4B-4H.

Figure 4B:
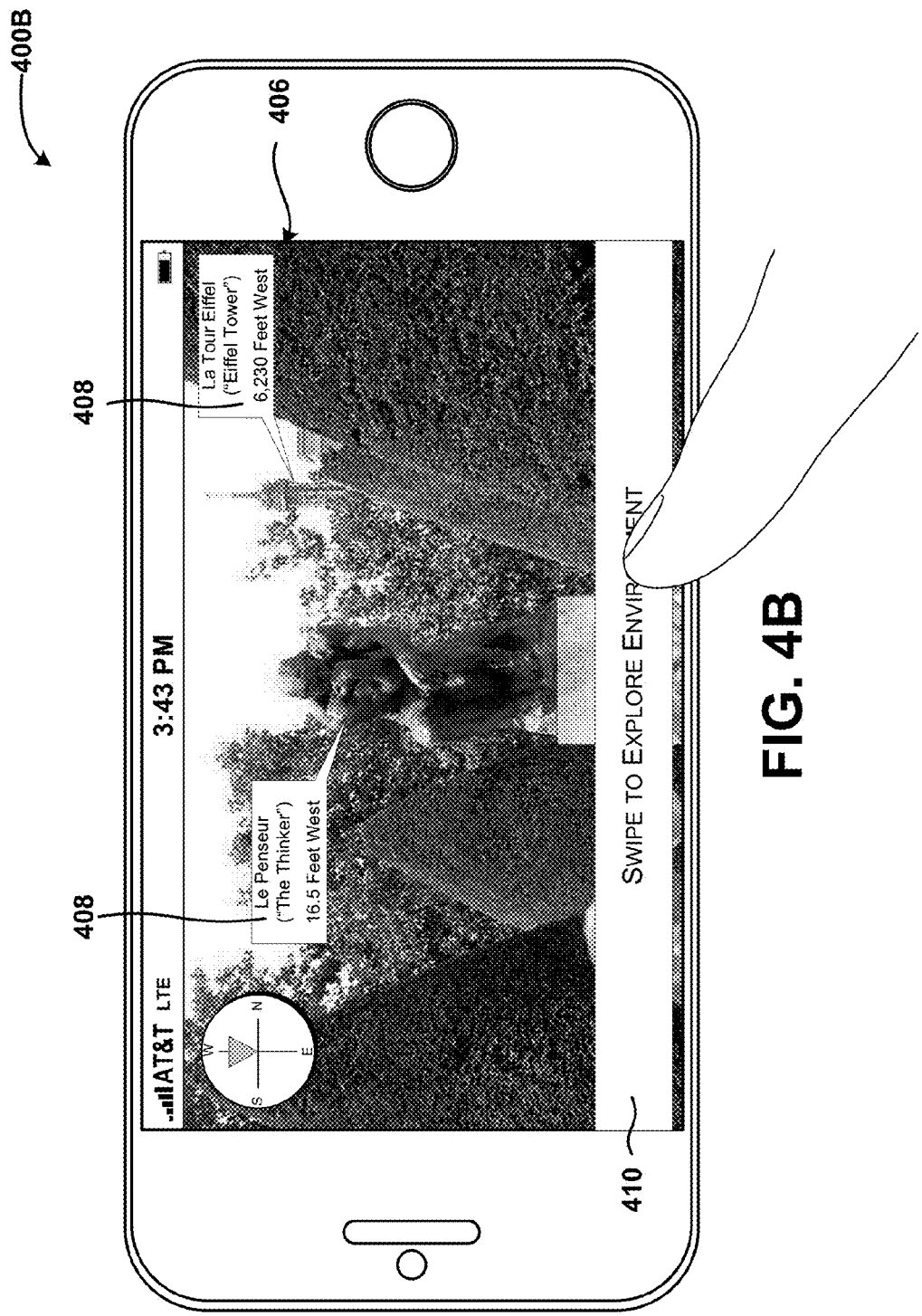

Referring now to FIG. 4B, a UI diagram showing additional aspects of the concepts and technologies disclosed herein for providing explorable augmented reality displays 110 using an augmented reality service 112 are described in detail. In particular, FIG. 4B shows an illustrative screen display 400B generated by a device such as the user device 102. It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

The screen display 400B can include an explorable augmented reality display 406. The explorable augmented reality display 406 can be used to present one or more explorable augmented reality displays 110 to a user or other entity. It can be appreciated that the explorable augmented reality display 406 can be presented in response to a user selecting the UI control 404 shown in FIG. 4A. Because the explorable augmented reality display 406 can be displayed at additional and/or alternative times, it should be understood that this embodiment is illustrative, and should not be construed as being limiting in any way.

The explorable augmented reality display 406 can include a view of the location or environment as seen through the camera or other imaging device associated with the user device 102, as explained above with reference to FIG. 4A. The explorable augmented reality display 406 also can include flags, tags, or other UI elements ("tags") 408. The tags 408 can provide information about items or objects within a current field of view of the camera or other imaging device. It should be understood that the camera or other imaging device can capture photographs or video, depending upon preferences, settings, and/or needs. The tags 408 can provide information about items within a view. In some embodiments, the tags 408 can include labels for the items or objects, as well as distance and/or direction information, if desired. In various other embodiments, the tags 408 can include data indicating if the item or object is free to see or access, business hours associated with a business or institution, other information, or the like.

The explorable augmented reality display 406 also can include a UI control 410 for exploring within the explorable augmented reality display 406. Thus, selection of the UI control 410 can cause the user device 102 to present augmented reality UI elements outside of the current field of view, as explained above in detail. According to various embodiments, the UI control 410 can include a scroll bar, cursors or arrows that can be tapped or otherwise manipulated, and/or a region of the display within which swipes or other gestures can be recognized as commands to explore the explorable augmented reality display 406. It should be understood that this example is illustrative and therefore should not be construed as being limiting in any way.

Referring now to FIG. 4C, a UI diagram showing additional aspects of the concepts and technologies disclosed herein for providing explorable augmented reality displays 110 using an augmented reality service 112 are described in detail. In particular, FIG. 4C shows an illustrative screen display 400C generated by a device such as the user device 102. It should be appreciated that the UI diagram illustrated in FIG. 4C is illustrative of one contemplated example of the UIs that can be generated and/or displayed in accordance with the concepts and technologies disclosed herein, and therefore should not be construed as being limited in any way.

The screen display 400C can include a manipulated view 412 of the explorable augmented reality display 406 shown in FIG. 4B. The manipulated view 412 can be presented in response to a user manipulating the UI control 410 shown in FIG. 4B. In particular, as shown in FIG. 4C, the user can enter a swipe gesture along the UI control 410 to present the manipulated view 412. Because the manipulated view 412 can be displayed at additional and/or alternative times, it should be understood that this embodiment is illustrative, and should not be construed as being limiting in any way.

The manipulated view 412 can include a partial view of the environment or location as seen through the camera or other imaging device associated with the user device 102, as explained above with reference to FIGS. 4A-4B. As shown in FIG. 4C, an active view can effectively be panned off the visible portion of the screen and instead a void 414 can be displayed on the screen display 400C. The void 414 can correspond to a portion of the explorable augmented reality display 110 that is outside of the field of view of the camera or other capture device. Thus, the void 414 can be blank or empty as shown in FIG. 4C, other than tags 408 or other UI elements associated with the location corresponding to the void 414.

As can be seen in FIG. 4C, a new tag 416 can be displayed on the manipulated view 412. The new tag 416 can point off the visible screen and therefore can indicate, to a user or other entity manipulating the explorable augmented reality display 406, that a point of interest is located in the direction indicated in the new tag 416.

The new tag 416 can provide information about items or objects outside of the current field of view of the camera or other imaging device. It should be understood that the camera or other imaging device can capture photographs or video, depending upon preferences, settings, and/or needs. In some embodiments, the new tag 416 also can include a label, distance information, direction information, and/or other information. It should be understood that this example is illustrative and therefore should not be construed as being limiting in any way.

In FIG. 4C, it can be appreciated that the viewing direction indicator 405 can be updated as the user or other entity manipulates the screen display 400C. As shown in FIG. 4C, the viewing direction indicator 405 also can include a current view scope and direction indicator ("current view cone") 417 in addition to, or instead of, the viewing direction indicator 405. The current view cone 417 can indicate a direction and/or scope of the environment that corresponds to the view depicted within the screen display 400C. Thus, a user or other entity can, via reference to the viewing direction indicator 405, the view cone 407, and the current view cone 417, understand a relative movement between the view shown in the screen display 400A and a subsequent view such as the view shown in the screen display 400C. It should be understood that this example is illustrative and therefore should not be construed as being limiting in any way.

Figure 4D:
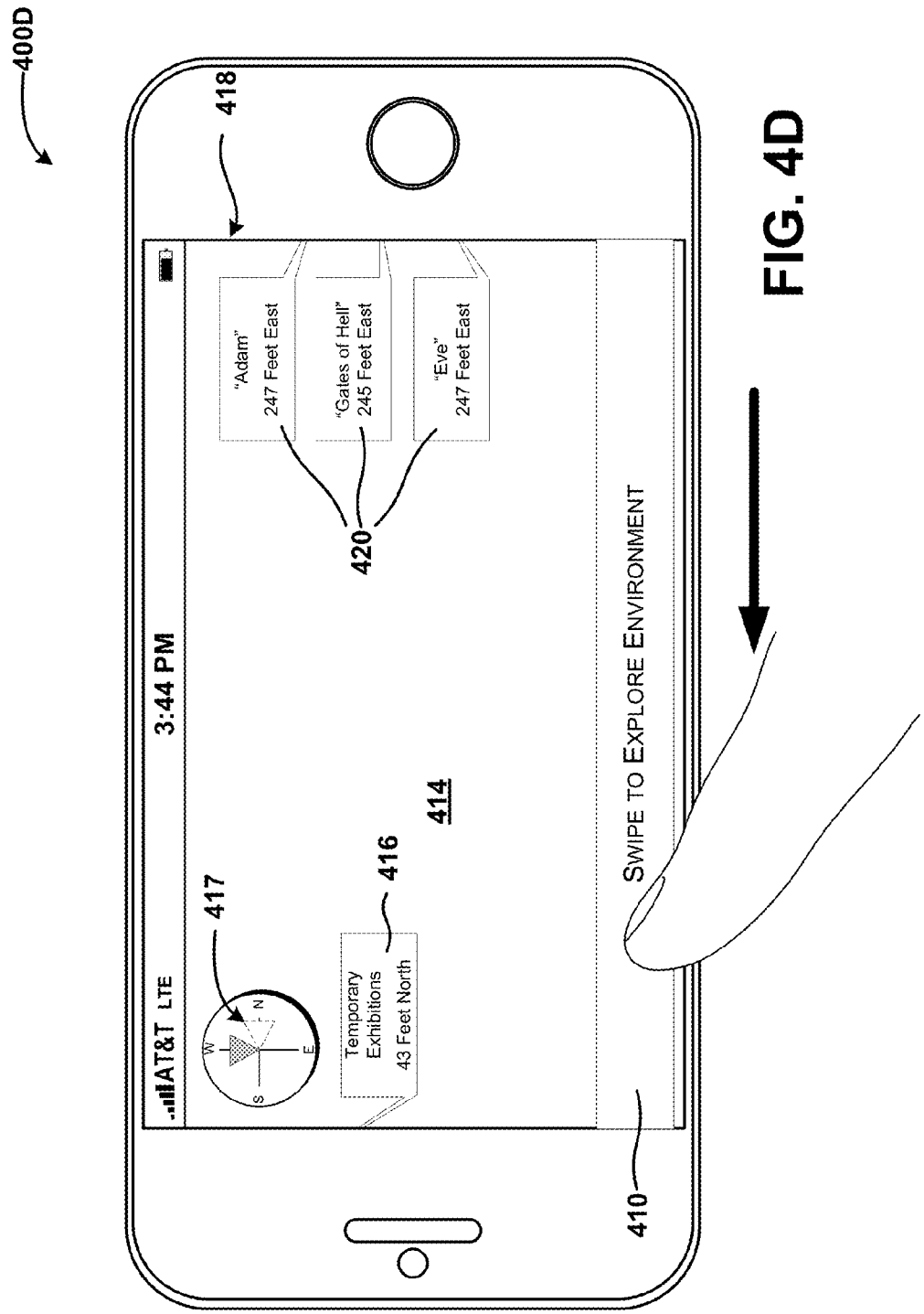

Referring now to FIG. 4D, a UI diagram showing additional aspects of the concepts and technologies disclosed herein for providing explorable augmented reality displays 110 using an augmented reality service 112 are described in detail. In particular, FIG. 4D shows an illustrative screen display 400D generated by a device such as the user device 102. It should be appreciated that the UI diagram illustrated in FIG. 4D is illustrative of one contemplated example of the UIs that can be generated and/or displayed in accordance with the concepts and technologies disclosed herein, and therefore should not be construed as being limited in any way.

The screen display 400D can include another manipulated view 418 of the explorable augmented reality display 406 shown in FIG. 4B (and therefore, can represent further manipulation of the manipulated view 412 shown in FIG. 4C). The manipulated view 418 can be presented in response to a user further manipulating the UI control 410 shown in FIG. 4C. Because the manipulated view 418 can be displayed at additional and/or alternative times, it should be understood that this embodiment is illustrative, and should not be construed as being limiting in any way.

As can be seen in FIG. 4D, the manipulated view 418 can omit a view of the environment or location as seen through the camera or other imaging device associated with the user device 102, as these portions of the environment/location can be outside of the portion of the virtual environment represented by the manipulated view 418. Thus, it can be appreciated that the active view can effectively be panned off the visible portion of the screen and instead only the void 414 can be displayed. Thus, the void 414 can be blank or empty as shown in FIG. 4D, other than the new tags 416, 420 or other UI elements associated with the location corresponding to the void 414.

As can be seen in FIG. 4D, the new tags 416, 420 can be displayed on the manipulated view 418. The new tags 416, 420 can point off the visible screen and therefore can indicate, to a user or other entity, that points of interest associated with the new tags 416, 420 are located in the direction indicated in the new tags 416, 420. The new tags 416, 420 can provide information about items or objects outside of the current field of view of the camera or other imaging device. It should be understood that this example is illustrative and therefore should not be construed as being limiting in any way.

As shown in FIG. 4D, the current view cone 417 has again been updated to show the current viewing direction and/or scope depicted within the screen display 400D. Thus, a user or other entity can, via reference to the viewing direction indicator 405, the view cone 407, and the current view cone 417, understand a relative movement between the view shown in the screen display 400A and/or 400C and a subsequent view such as the view shown in the screen display 400D. It should be understood that this example is illustrative and therefore should not be construed as being limiting in any way.

Referring now to FIG. 4E, a UI diagram showing additional aspects of the concepts and technologies disclosed herein for providing explorable augmented reality displays 110 using an augmented reality service 112 are described in detail. In particular, FIG. 4E shows an illustrative screen display 400E generated by a device such as the user device 102. It should be appreciated that the UI diagram illustrated in FIG. 4E is illustrative of one contemplated example of the UIs that can be generated and/or displayed in accordance with the concepts and technologies disclosed herein, and therefore should not be construed as being limited in any way.

The screen display 400E can include yet another manipulated view 422 of the explorable augmented reality display 406 shown in FIG. 4B (and therefore, can represent further manipulation of the manipulated view 418 shown in FIG. 4D). The manipulated view 422 can be presented in response to a user further manipulating the UI control 410 shown in FIGS. 4B-4D. Because the manipulated view 422 can be displayed at additional and/or alternative times, it should be understood that this embodiment is illustrative, and should not be construed as being limiting in any way.

As can be seen in FIG. 4E, the manipulated view 422 can correspond to a point at which the new tags 420 are centered within the void 414, though this is not necessarily the case. The new tags 420 can point to points within the void 414, and therefore can indicate, to a user or other entity, that the points of interest associated with the new tags 420 are located in a portion of the environment or location that corresponds to the void 414. It should be understood that this example is illustrative and therefore should not be construed as being limiting in any way.

The manipulated view 422 also can include a UI control 424 for activating a live scan. Selection of the UI control 424 can cause the user device 102 to activate a camera or other imaging device so that a user can view an augmented display view corresponding to the void 414. Thus, in some embodiments, the user can turn his or her body (and/or the user device 102) to point in the direction of the location/environment that corresponds to the void 414, and then select the UI control 424 to view a captured image of the location/environment in that direction. An example is shown in FIG. 4F.

As shown in FIG. 4E, the current view cone 417 has again been updated to show the current viewing direction and/or scope depicted within the screen display 400E. Thus, a user or other entity can, via reference to the viewing direction indicator 405, the view cone 407, and the current view cone 417, understand a relative movement between the view shown in the screen display 400A, 400C, and/or 400D and a subsequent view such as the view shown in the screen display 400E. It should be understood that this example is illustrative and therefore should not be construed as being limiting in any way.

Figure 4F:
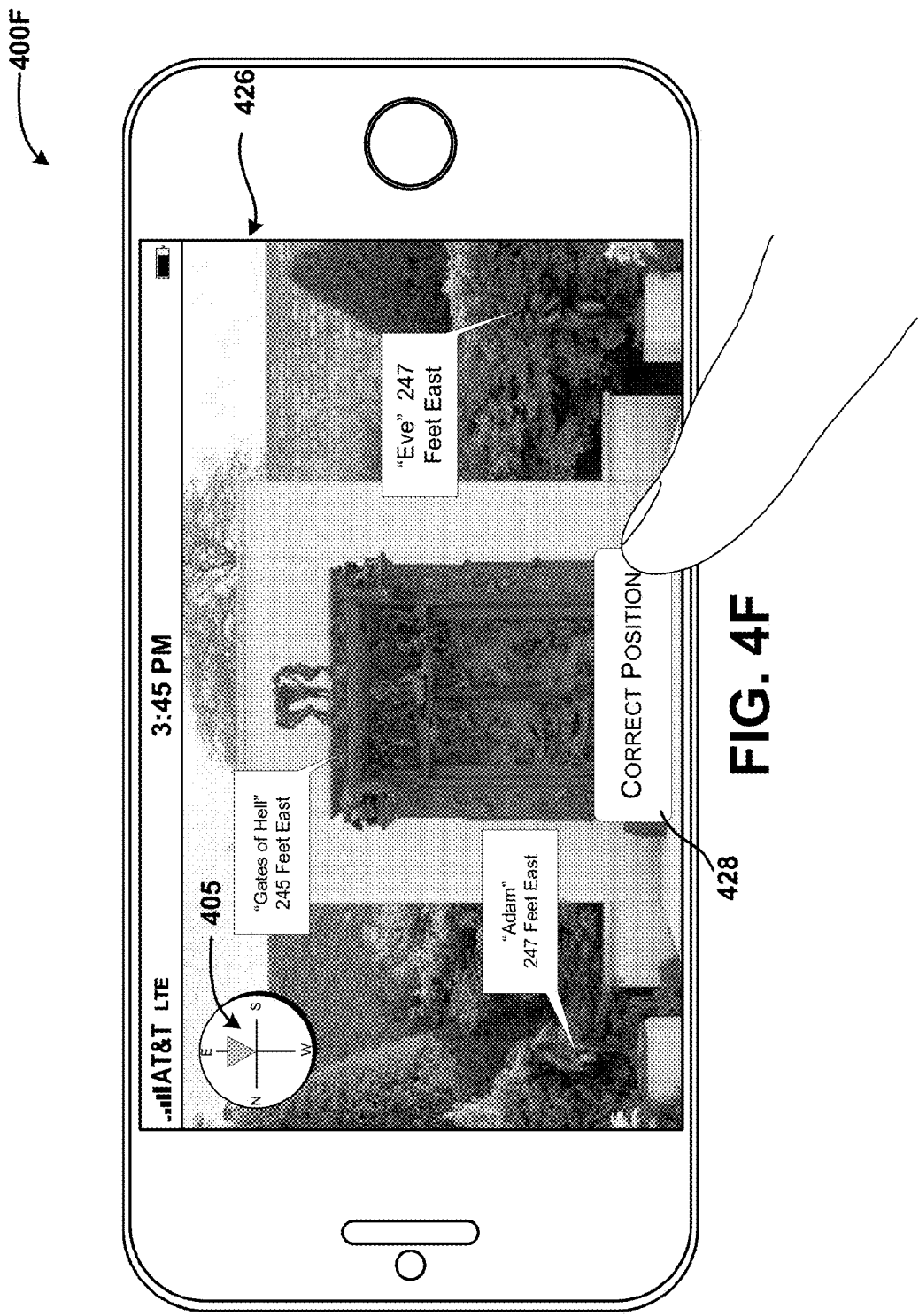

Turning now to FIG. 4F, a UI diagram showing additional aspects of the concepts and technologies disclosed herein for providing explorable augmented reality displays 110 using an augmented reality service 112 are described in detail. In particular, FIG. 4F shows an illustrative screen display 400F generated by a device such as the user device 102. It should be appreciated that the UI diagram illustrated in FIG. 4F is illustrative of one contemplated example of the UIs that can be generated and/or displayed in accordance with the concepts and technologies disclosed herein, and therefore should not be construed as being limited in any way.

The screen display 400F can include another explorable augmented reality display 426. The explorable augmented reality display 426 can be presented in response to a user selecting the UI control 424 shown in FIG. 4E. Because the explorable augmented reality display 426 can be displayed at additional and/or alternative times, it should be understood that this embodiment is illustrative, and should not be construed as being limiting in any way.

As can be seen in FIG. 4F, the explorable augmented reality display 426 can provide the new tags 420 shown in FIGS. 4D-4E, but can show these new tags 420 as overlays on a video or photo of the real location or environment. Although the new tags 420 are shown in their correct relationship relative to the sculptures shown in FIG. 4F, it is possible that UI elements such as tags, flags, or the like can be displayed at locations that do not match the real world elements to which they relate.

In particular, if the augmented reality display application 108 is used indoors or at other locations at which obtaining exact geolocation is difficult or impossible, the tags or other UI elements may be displayed at locations that do not match the real world elements. This can be, for example, because the expected or estimated location of the user device 102 may not accurately reflect the real location, and as such, tags that are estimated to be in front of the user device 102 may in fact be behind the user device, and/or vice versa. As such, embodiments of the concepts and technologies described herein support user interfaces and technologies for updating or correcting position for the explorable augmented reality displays 110 and/or for other reasons.

Thus, the screen display 400F also includes a UI control 428 for correcting a position or location of the user device 102 relative to the location or environment. Upon selection of the UI control 428, the user device 102 can be configured to present a UI for adjusting location and/or position, or can take other actions to update location. It should be understood that this example is illustrative and therefore should not be construed as being limiting in any way.

As shown in FIG. 4F, the viewing direction indicator 405 and the view cone 407 have been updated to show the current viewing direction and/or scope depicted within the screen display 400F. Thus, a user or other entity can, via reference to the viewing direction indicator 405 and the view cone 407 understand a relative movement and/or facing direction change between the views shown in the screen displays 400A, 400C, 400D, or 400E and a subsequent view and/or pointing direction such as the view and pointing direction depicted in the screen display 400F. It should be understood that this example is illustrative and therefore should not be construed as being limiting in any way.

Referring now to FIG. 4G, a UI diagram showing additional aspects of the concepts and technologies disclosed herein for providing explorable augmented reality displays 110 using an augmented reality service 112 are described in detail. In particular, FIG. 4G shows an illustrative screen display 400G generated by a device such as the user device 102. It should be appreciated that the UI diagram illustrated in FIG. 4G is illustrative of one contemplated example of the UIs that can be generated and/or displayed in accordance with the concepts and technologies disclosed herein, and therefore should not be construed as being limited in any way.

The screen display 400G can include a location correction display 430. The location correction display 430 can be used to correct a location or position of a user device 102 or user relative to one or more augmented reality elements such as tags, or the like. It should be appreciated that the location correction display 430 can be presented in response to a user selecting the UI control 428 shown in FIG. 4F. Because the location correction display 430 can be displayed at additional and/or alternative times, it should be understood that this embodiment is illustrative, and should not be construed as being limiting in any way.

The location correction display 430 can include a view of the location or environment in which the user or user device 102 is located. In some embodiments, the location correction display 430 includes a plan view showing representations of the augmented reality tags or elements in the location or environment and an indicator of current location of the user device 102 within that location or environment. As such, the user or other entity can see a relationship between the augmented reality tags or elements and a location of the user or user device 102 and can be given the opportunity to correct the position and/or location of the user or user device 102.

As shown in FIG. 4G, the location correction display 430 can include icons 432. The icons 432 can correspond to relative positions of objects in the real world (relative to the current estimated or known location of the user device 102) that are included in the augmented reality display data 116 upon which the explorable augmented reality display 110 is based. It should be understood that the icons 432 can be replaced and/or supplemented with flags, tags, or the like, and that the illustrated embodiment is merely illustrative of the concepts and technologies described herein. Also, the location correction display 430 can include an estimated or known location indicator 434, which can correspond to a known or estimated location of the user device 102. Again, it should be understood that this embodiment is illustrative and therefore should not be construed as being limiting in any way.

In some embodiments, the user can adjust his or her location or position, relative to the icons 432, by knowing his or her location in the real world and adjusting the location of the estimated or known location indicator 434 based upon that knowledge. For example, the user or other entity may know that a real world object that corresponds to the icon 432 labeled "5" is actually located behind the user or other entity, while in the location correction display 430, the icon 432 labeled "5" is shown in front of the user or other entity. Thus, the user or other entity can adjust the location of the estimated or known location indicator 434 to correct this error, as shown collectively in FIGS. 4G-4H.

Figure 4H:
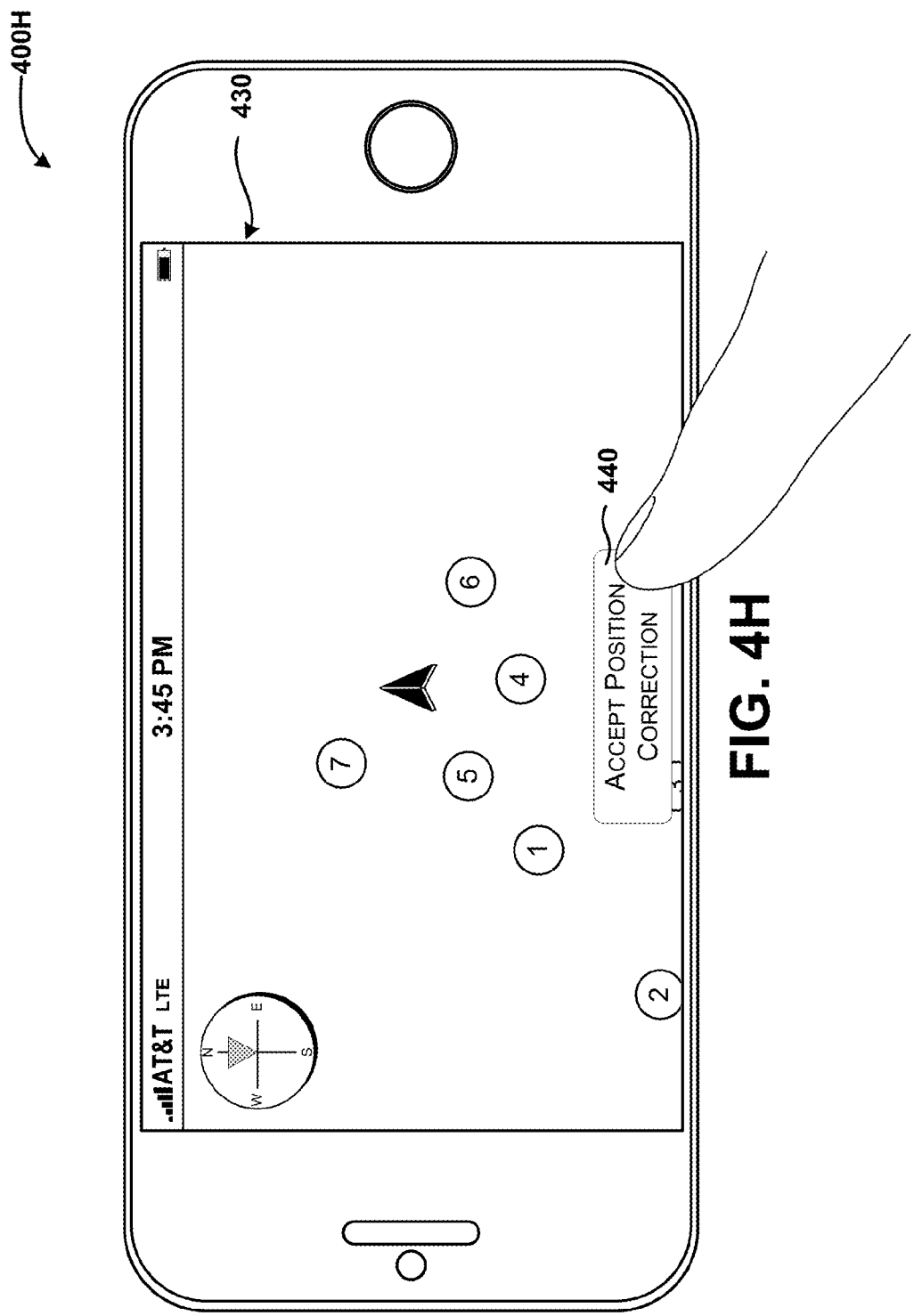

In particular, FIG. 4G shows a user or other entity tapping the estimated or known location indicator 434 and dragging the estimated or known location indicator 434 along a path 436 to a new location 438. In FIG. 4H, the icons 432 are shown in their corrected locations relative to the corrected location of the estimated or known location indicator 434. As shown in FIGS. 4G-4H, the location correction display 430 also can include a UI control 440 for accepting a location or position correction. In some embodiments, selection of the UI control 440 can accept the changes and also can communicate, to the server computer 114, the location correction as illustrated and described above with reference to operations 208 and 314 of FIGS. 2 and 3. It should be understood that these examples are illustrative and therefore should not be construed as being limiting in any way.

It should be understood that the camera or other imaging device can capture photographs or video, depending upon preferences, settings, and/or needs. The tags 408 can provide information about items within view. In some embodiments, the tags 408 can include labels for the items or objects, as well as distance and/or direction information, if desired. In various other embodiments, the tags 408 can include data indicating if the item or object is free to see or access, business hours associated with a business or institution, other information, or the like.

The location correction display 430 also can include a UI control 410 for exploring within the location correction display 430. Thus, selection of the UI control 410 can cause the user device 102 to present UI elements outside of the current field of view, as explained above in detail. According to various embodiments, the UI control 410 can include a scroll bar, cursors or arrows that can be tapped or otherwise manipulated, and/or a region of the display within which swipes or other gestures can be recognized as commands to explore the location correction display 430. It should be understood that this example is illustrative and therefore should not be construed as being limiting in any way.

Figure 5:
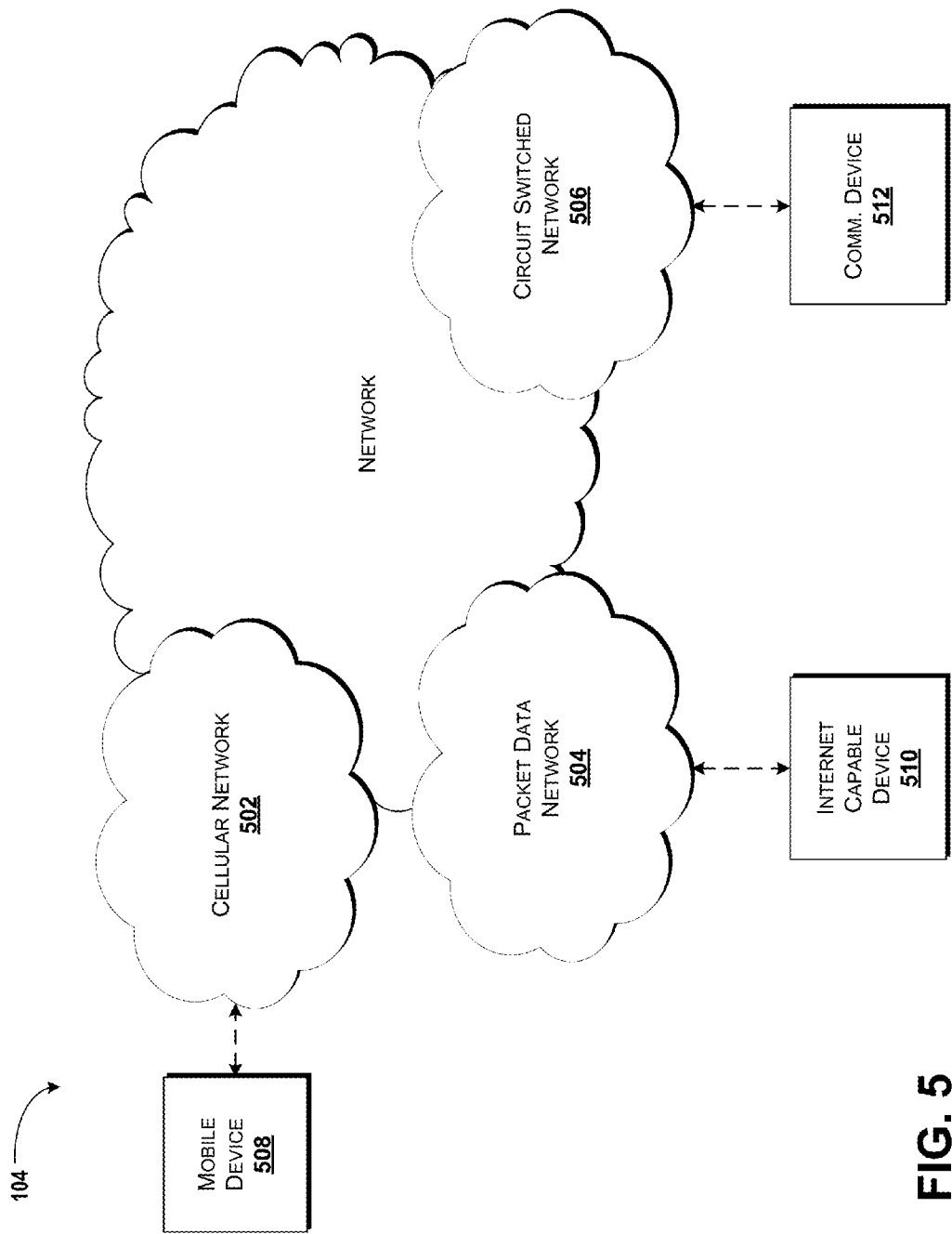
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
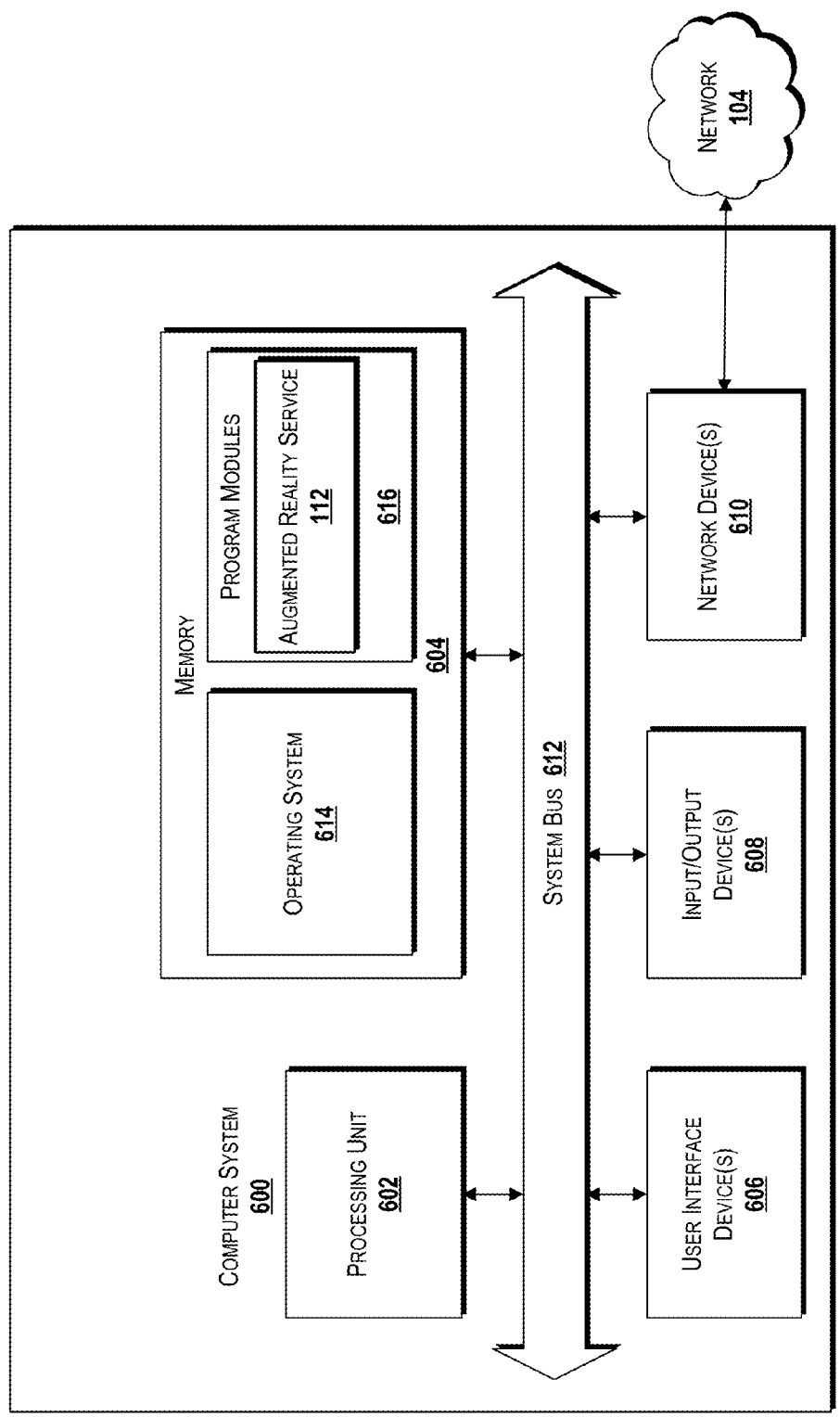
FIG. 6 is a block diagram illustrating an example computer system configured to generate and provide data for explorable augmented reality displays, according to some illustrative embodiments.

FIG. 6 is a block diagram illustrating a computer system 600 configured to provide the functionality described herein for providing explorable augmented reality displays, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the augmented reality service 112 and/or the augmented reality display application 108 (not shown in FIG. 6). This and/or other programs can be embodied in computer-readable media containing instructions that, when executed by the processing unit 602, perform one or more of the methods 200, 300 described in detail above with respect to FIGS. 2-3. According to some embodiments, the program modules 616 may be embodied in hardware, software, firmware, or any combination thereof. Although not shown in FIG. 6, it should be understood that the memory 604 also can be configured to store the explorable augmented reality display 110, the augmented reality display data 116, the augmented reality data 122, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
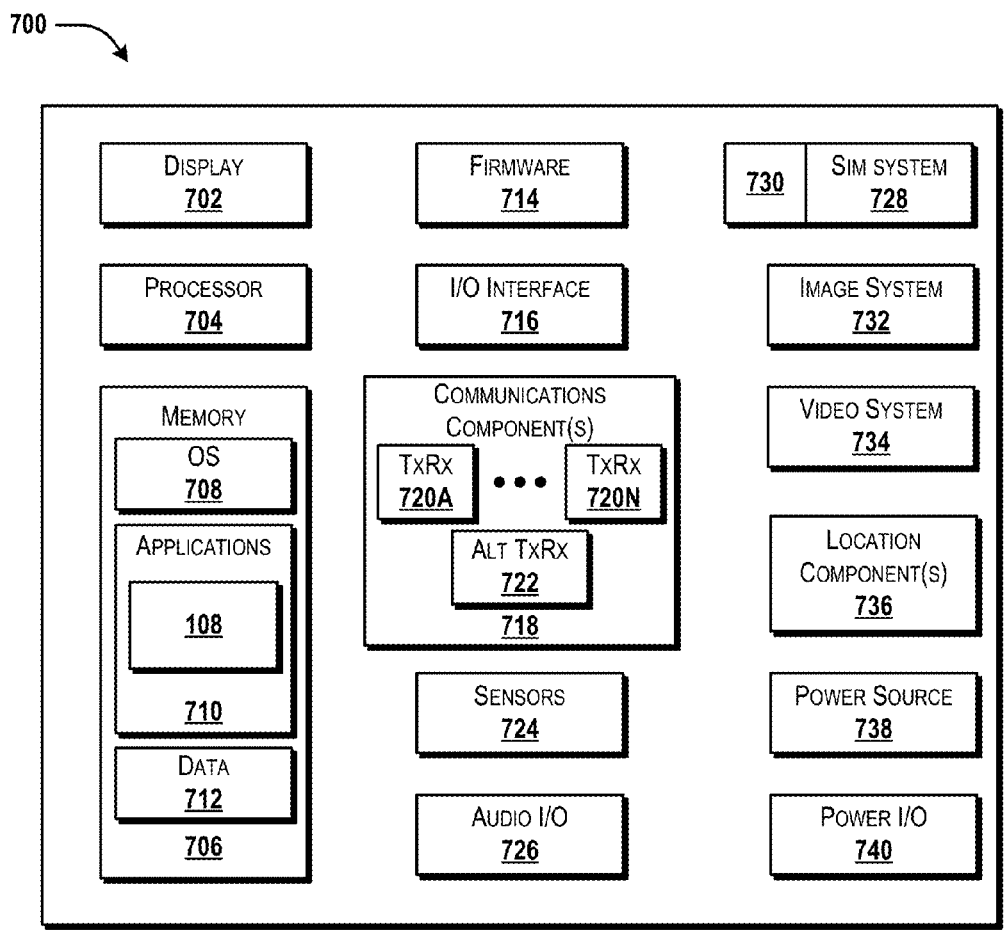
FIG. 7 is a block diagram illustrating an example mobile device configured to interact with an augmented reality service, according to some illustrative embodiments.

Turning now to FIG. 7, an illustrative mobile device 700 and components thereof will be described. In some embodiments, the user device 102 described above with reference to FIGS. 1-4H can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for explorable augmented reality displays 110, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the augmented reality display application 108, the augmented reality service 112, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, capturing video or photographs, providing augmented reality views, correcting position and/or location, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the augmented reality data 122, the augmented reality display data 116 and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, selection of UI controls, orientation information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/0 interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for explorable augmented reality displays have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
  receiving, at a processor executing an augmented reality service, a request for augmented reality display data, the request being associated with a device;
  determining, at the processor, a geographic location associated with the device;
  identifying, at the processor, augmented reality data associated with the geographic location, wherein the augmented reality data comprises an augmented reality object that is outside of a field of view associated with the device; and
  providing, by the processor and to the device, the augmented reality display data for display in an explorable augmented reality display that is configured to display the augmented reality object in a view that omits a portion of the field of view associated with the device, the augmented reality display data comprising the augmented reality data, wherein the explorable augmented reality display is configured such that in response to a manipulation of the explorable augmented reality display,
    a portion of the field of view is panned off of a visible portion of a screen,
    a void is displayed on the screen, wherein the void corresponds to a portion of the explorable augmented reality display that is outside of the field of view and is displayed when the portion of the field of view is panned off of the visible portion of the screen, and
    the augmented reality object is displayed in the void.

2. The method of claim 1, wherein determining the geographic location associated with the device comprises receiving, with the request for the augmented reality display data, location data and orientation data that defines a facing direction of the device.

3. The method of claim 2, wherein the location data and the orientation data are captured by the device.

4. The method of claim 1, wherein determining the geographic location associated with the device comprises accessing a location server to obtain location data associated with the device.

5. The method of claim 1, wherein the device comprises a smartphone, and wherein the smartphone executes an augmented reality display application that generates the request and the explorable augmented reality display.

6. The method of claim 1, further comprising:
  obtaining, by the processor, a location update from the device.

7. The method of claim 1, wherein the device is configured to provide a correction of the geographic location, wherein the correction is obtained by the device by presenting a location correction display and receiving the correction of the geographic location via the location correction display.

8. A system comprising:
  a processor; and
  a memory that stores computer-executable instructions that, when executed by the processor, cause the processor to perform operations comprising
    receiving a request for augmented reality display data, the request being associated with a device,
    determining a geographic location associated with the device,
    identifying augmented reality data associated with the geographic location, wherein the augmented reality data comprises an augmented reality object that is outside of a field of view associated with the device, and
    providing the augmented reality display data to the device for display in an explorable augmented reality display that is configured to display the augmented reality object in a view that omits a portion of the field of view associated with the device, the augmented reality display data comprising the augmented reality data, wherein the explorable augmented reality display is configured such that in response to a manipulation of the explorable augmented reality display,
      a portion of the field of view is panned off of a visible portion of a screen,
      a void is displayed on the screen, wherein the void corresponds to a portion of the explorable augmented reality display that is outside of the field of view and is displayed when the portion of the field of view is panned off of the visible portion of the screen,
    and
      the augmented reality object is displayed in the void.

9. The system of claim 8, wherein the computer-executable instructions, when executed by the processor, cause the processor to perform operations further comprising:
  determining an orientation of the device, the orientation comprising a facing direction.

10. The system of claim 8, wherein determining the geographic location associated with the device comprises receiving, with the request for the augmented reality display data, location data and orientation data that defines a facing direction of the device.

11. The system of claim 8, wherein the computer-executable instructions, when executed by the processor, cause the processor to perform operations further comprising:
  obtaining a location update from the device.

12. The system of claim 8, wherein the device is configured to provide a correction of the geographic location, wherein the correction is obtained by the device by presenting a location correction display and receiving the correction of the geographic location via the location correction display.

13. A computer storage medium having computer-executable instructions stored thereon that, when executed by a processor, cause the processor to perform operations comprising:
  receiving a request for augmented reality display data, the request being associated with a device;
  determining a geographic location associated with the device;
  identifying augmented reality data associated with the geographic location, wherein the augmented reality data comprises an augmented reality object that is outside of a field of view associated with the device; and
  providing the augmented reality display data to the device for display in an explorable augmented reality display that is configured to display the augmented reality object in a view that omits a portion of the field of view associated with the device, the augmented reality display data comprising the augmented reality data, wherein the explorable augmented reality display is configured such that in response to a manipulation of the explorable augmented reality display, a portion of the field of view is panned off of a visible portion of a screen, a void is displayed on the screen, wherein the void corresponds to a portion of the explorable augmented reality display that is outside of the field of view and is displayed when the portion of the field of view is panned off of the visible portion of the screen, and the augmented reality object is displayed in the void.

14. The computer storage medium of claim 13, wherein the computer-executable instructions, when executed by the processor, cause the processor to perform operations further comprising:

determining an orientation of the device, the orientation comprising a facing direction.

15. The computer storage medium of claim 13, wherein determining the geographic location associated with the device comprises obtaining location data and orientation data that defines a facing direction of the device.

16. The computer storage medium of claim 13, wherein the computer-executable instructions, when executed by the processor, cause the processor to perform operations further comprising:

obtaining a location update from the device.

17. The computer storage medium of claim 13, wherein the device is configured to provide a correction of the geographic location, wherein the correction is obtained by the device by presenting a location correction display and receiving the correction of the geographic location via the location correction display.

\* \* \* \* \*